United States Patent
Long et al.

(10) Patent No.: US 11,763,332 B2
(45) Date of Patent: Sep. 19, 2023

(54) EDGE COMPUTING PLATFORM SUPPORTED BY SMART CONTRACT ENABLED BLOCKCHAIN NETWORK

(71) Applicant: Theta Labs, Inc., San Jose, CA (US)

(72) Inventors: Jieyi Long, Santa Clara, CA (US); Mitchell C. Liu, Los Altos, CA (US)

(73) Assignee: Theta Labs, Inc., San Jose, CA (US)

( * ) Notice: Subject to any disclaimer, the term of this patent is extended or adjusted under 35 U.S.C. 154(b) by 0 days.

(21) Appl. No.: 17/302,398

(22) Filed: Apr. 30, 2021

(65) Prior Publication Data

US 2022/0156776 A1 May 19, 2022

Related U.S. Application Data

(60) Provisional application No. 63/114,087, filed on Nov. 16, 2020.

(51) Int. Cl.
*G06Q 30/0207* (2023.01)
*G06F 9/48* (2006.01)

(52) U.S. Cl.
CPC ....... *G06Q 30/0215* (2013.01); *G06F 9/4881* (2013.01)

(58) Field of Classification Search
CPC .. G06Q 30/0215; G06Q 20/00; G06F 9/4881; G06F 21/00; G06F 17/00; H04L 2209/00; H04L 63/00; H04L 67/00
See application file for complete search history.

(56) References Cited

U.S. PATENT DOCUMENTS

| 10,841,372 B1* | 11/2020 | Ram | H04L 65/4084 |
| 2015/0189011 A1* | 7/2015 | Hunt | H04L 67/108 |
| | | | 709/219 |

(Continued)

FOREIGN PATENT DOCUMENTS

| CN | 110999204 A | 4/2020 |
| CN | 111428204 A | 7/2020 |

(Continued)

OTHER PUBLICATIONS

Peh, Bernard; "Calling the Function of Another Contract in Solidity", Mar. 5, 2018 https://medium.com/@blockchain101/calling-the-function-of-another-contract-in-solidity-f9edfa921f4c (Year: 2018).*

(Continued)

*Primary Examiner* — Kambiz Abdi
*Assistant Examiner* — Scott Snider
(74) *Attorney, Agent, or Firm* — American Patent Agency PC; Daniar Hussain; Stephen M. Hou

(57) ABSTRACT

Methods and systems for blockchain and smart contract-supported decentralized computation are provided. A computation task from a task initiator node is registered on a blockchain, and assigned to an edge computing node within a decentralized computing network, with task details sent by the task initiator to the edge computing node through a secure peer-to-peer connection. The edge computing node determines a solution to the computation task. The solution may be verified on-chain by a smart contract, and a token reward from the task initiator may be given to the edge computing node by the smart contract correspondingly. The solution may alternatively be verified off-chain by the task initiator node, and a token reward may be given to the edge computing node by the smart contract upon solution verification.

9 Claims, 15 Drawing Sheets

(56) References Cited

U.S. PATENT DOCUMENTS

| | | | |
|---|---|---|---|
| 2021/0021431 A1* | 1/2021 | Guim Bernat | H04L 9/3247 |
| 2021/0083849 A1* | 3/2021 | Liang | H04L 63/123 |
| 2021/0247776 A1* | 8/2021 | Faye | G05D 1/0291 |
| 2021/0248536 A1* | 8/2021 | Sheikh | G06Q 20/0855 |
| 2021/0357387 A1* | 11/2021 | Lee | G06F 16/258 |

FOREIGN PATENT DOCUMENTS

| | | | | | |
|---|---|---|---|---|---|
| WO | 2020010159 | A1 | | 1/2020 | |
| WO | 2020022956 | A1 | | 1/2020 | |
| WO | 2020022957 | A1 | | 1/2020 | |
| WO | 2020022958 | A1 | | 1/2020 | |
| WO | WO-2020134698 | A1 | * | 7/2020 | G06F 21/64 |
| WO | WO-2020216858 | A1 | * | 10/2020 | H04L 9/3239 |

OTHER PUBLICATIONS

N. C. Luong, Z. Xiong, P. Wang and D. Niyato, "Optimal Auction for Edge Computing Resource Management in Mobile Blockchain Networks: A Deep Learning Approach," 2018 IEEE International Conference on Communications (ICC), Kansas City, MO, USA, 2018, pp. 1-6, doi: 10.1109/ICC.2018.8422743. (Year: 2018).*

R. Yang, F. R. Yu, P. Si, Z. Yang and Y. Zhang, "Integrated Blockchain and Edge Computing Systems: A Survey, Some Research Issues and Challenges," in IEEE Communications Surveys & Tutorials, vol. 21, No. 2, pp. 1508-1532, Secondquarter 2019, doi: 10.1109/COMST.2019.2894727. (Year: 2019).*

M. Liu, F. R. Yu, Y. Teng, V. C. M. Leung and M. Song, "Distributed Resource Allocation in Blockchain-Based Video Streaming Systems With Mobile Edge Computing," in IEEE Transactions on Wireless Communications, vol. 18, No. 1, pp. 695-708, Jan. 2019, doi: 10.1109/TWC.2018.2885266. (Year: 2019).*

Y. Liu, F. R. Yu, X. Li, H. Ji and V. C. M. Leung, "Decentralized Resource Allocation for Video Transcoding and Delivery in Blockchain-Based System With Mobile Edge Computing," in IEEE Transactions on Vehicular Technology, vol. 68, No. 11, pp. 11169-11185, Nov. 2019, doi: 10.1109/TVT.2019.2937351. (Year: 2019).*

Y. Jiao, P. Wang, D. Niyato and Z. Xiong, "Social Welfare Maximization Auction in Edge Computing Resource Allocation for Mobile Blockchain," 2018 IEEE International Conference on Communications (ICC), Kansas City, MO, USA, 2018, pp. 1-6, doi: 10.1109/ICC.2018.8422632. (Year: 2018).*

K.-L. Wright, M. Martinez, U. Chadha and B. Krishnamachari, "SmartEdge: A Smart Contract for Edge Computing," 2018 IEEE International Conference on Internet of Things (iThings) and IEEE Green Computing and Communications (GreenCom) and IEEE Cyber, Physical and Social Computing (CPSCom) and IEEE Smart Data (SmartData), Halifax, NS, Canada, 2018, pp. 1685-1690, doi: 10.1109/Cybermatics_2018.2018.00281. (Year: 2018).*

Li et al., "CrowdBC: A Blockchain-based Decentralized Framework for Crowdsourcing", IEEE Transactions on Parallel and Distributed Systems, vol. 30, Issue 6, Jun. 1, 2019, pp. 1-15.

Zhou et al., "Solutions to Scalability of Blockchain: A Survey", IEEE Access, vol. 8, Jan. 27, 2020, pp. 6440-16455.

* cited by examiner

300

330 Applications
DApp Partners and Developers

320 Crypto Economic Infrastructure
THETA Labs and Partners

310 THETA Protocol
THETA Labs

314
Decentralized
Computation
Protocol

316
Delivery
Protocol

312 Ledger Protocol

Fig. 3

EDGE COMPUTING PLATFORM SUPPORTED BY SMART CONTRACT ENABLED BLOCKCHAIN NETWORK

REFERENCE TO RELATED APPLICATIONS

If an Application Data Sheet (ADS) has been filed on the filing date of this application, it is incorporated by reference herein. Any applications claimed on the ADS for priority under 35 U.S.C. §§ 119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

This application is also related to U.S. Ser. No. 16/726,148, filed on 23 Dec. 2019, entitled "Methods and Systems for Micropayment Support to Blockchain Incentivized, Decentralized Data Streaming and Delivery" (Docket No. THETA-1001), and U.S. Ser. No. 16/751,772, filed on 24 Jan. 2020, entitled "Methods and Systems for a Decentralized Data Streaming and Delivery Network" (Docket No. THETA-1002), each of which is itself a non-provisional of and claims the benefit of priority to provisional application U.S. Ser. No. 62/880,682, filed on 31 Jul. 2019, entitled "Methods and Systems for Micropayment Support to Blockchain-Incentivized, Decentralized Video Streaming and Delivery" (Docket No. THETA-1001P) and is also a non-provisional of and claims the benefit of priority to provisional application U.S. Ser. No. 62/914,176, filed on 11 Oct. 2019, entitled "Methods and Systems for a Decentralized Data Streaming and Delivery Network" (Docket No. THETA-1002P) the entire disclosures of all of which are hereby incorporated by reference in their entireties herein.

NOTICE OF COPYRIGHTS AND TRADEDRESS

A portion of the disclosure of this patent document contains material which is subject to copyright protection. This patent document may show and/or describe matter which is or may become tradedress of the owner. The copyright and tradedress owner has no objection to the facsimile reproduction by anyone of the patent disclosure as it appears in the U.S. Patent and Trademark Office files or records, but otherwise reserves all copyright and tradedress rights whatsoever.

FIELD OF THE INVENTION

Embodiments of the present invention are in the field of decentralized resource sharing, and pertain particularly to methods and systems for an incentivized, distributed computation platform.

BACKGROUND OF THE INVENTION

The statements in this section may serve as a background to help understand the invention and its application and uses, but may not constitute prior art.

Recent advancements in software and hardware design and manufacturing, as well as developments in faster networking protocols, have enabled the sharing and distribution of many types of resources, including but not limited to, redundant or unused bandwidths, storage, and computation and processing powers.

In a first example, storage and bandwidth sharing among users in a peer-to-peer (P2P) network provides a promising solution to the "last-mile" bottleneck in data streaming and delivery. Internet video accounts for over three-quarters of all Internet traffic today, and is predicted to grow further by 4 to 12 folds within the next few years. While Content Delivery Networks (CDNs) with huge numbers of distributed servers provide a backbone infrastructure to minimize delay in data delivery by reducing the geographical distances between servers and users, the "last-mile" bottleneck between a limited number of Point-of-Presence (POPs) data centers and end users still leads to less than optional user experiences, including link failures, noticeable delays, choppy streams, poor picture quality, and frequent rebuffering. Decentralized P2P data streaming and delivery platforms have therefore been proposed based on self-organizing and self-configuring mesh networks, where peer users can share redundant or unused bandwidth and storage resources.

In another example, Internet-based public distributed computing projects such as SETI@home, hosted by the U.C. Berkeley Search for Extraterrestrial Intelligence (SETI) Research Center, utilizes spare computing recourses and processing power from its more than three million volunteer personal computers to analyze electromagnetic radio signals, in the hope of finding intelligent extraterrestrial civilizations. Similar to the use of CDN servers for content distribution, client-server interactions allow the volunteers to download pieces of data to process during their unused/idle CPU cycles, and results are sent back to SETI's servers for further testing and aggregation. As more observational data are collected to cover more parts of the sky in possibly higher resolutions, the need for computation power also scales exponentially. Other large-scale scientific research projects such as the Human Genome Project utilizes similar setups to perform data comparison and modeling in a decentralized fashion.

While existing distributed computing projects can somewhat efficiently utilize computing time on their network of user computers, such platforms are still centralized in the sense that only specialized project servers hosted by large companies or institutions can assign tasks and manage resource usage. That is, smaller companies and individuals can hardly tap into such distributed computing networks for use on projects having much smaller scales. In addition, individual users in such distributed computing networks typically participate on a volunteer basis, motivated only by interests in contributing to scientific research, while shouldering the costs of energy, bandwidth, and equipment wear.

Therefore, in view of the aforementioned difficulties, there is an unsolved need to provide a decentralized computing platform that allows fast and secure resource sharing by any user with any other user, with many more users incentivized to actively share available resources.

It is against this background that various embodiments of the present invention were developed.

BRIEF SUMMARY OF THE INVENTION

Methods and systems are provided for an incentivized, distributed, and decentralized computing network or platform. In one embodiment, the decentralized edge computing platform involves two main types of nodes and associated smart contracts:

The "task initiator", which represents any entity that uses the edge computing platform to solve its computational tasks. The Task Initiator posts tasks for the edge computing nodes to download and solve. It is also responsible for registering the tasks on the blockchain and providing the rewards for each task. The tasks can be anything ranging from solving a set of equations to transcoding a video.

The "edge computing nodes", which poll the task initiator to get and complete the tasks. An edge computing node is a generic computational platform which can host various software, including the solver for the tasks issued by the task initiator. Once a task is solved by an edge computing node, it can upload the solution. Edge computing nodes may also be known as "edge worker nodes" or simply "edge nodes."

The "smart contracts", hosted by the blockchain, act as a trustless escrow for the task rewards. Once a submitted solution is verified, the reward will be transferred to the solver (i.e. an edge computing node) automatically and transparently.

In short, and according to one embodiment, the system comprises task initiator nodes that initiate computation tasks, and edge computing nodes that execute computation tasks and receive micropayment rewards for completion of the computation tasks. Furthermore, the solutions can be verified by on-chain directly by the smart contract, or verified off-chain by the task initiator node. Task initiator nodes and edge computing nodes, with both on-chain and off-chain solution verification, are summarized in turn.

Task Initiator Nodes with On-Chain Solution Verification More specifically, in one aspect, one embodiment of the present invention is a computer-implemented method utilized by a task initiator node in a decentralized computing network, for blockchain and smart contract-supported decentralized computation with on-chain solution verification. The method includes the steps of registering a computation task on a blockchain by invoking a smart contract on the blockchain. Then, assigning the computation task to an edge computing node in the decentralized computing network by sending task information to the edge computing node. Finally, downloading a solution to the computation task from the blockchain. The solution is computed and submitted to the smart contract by the edge computing node, the solution is verified by the smart contract, and a reward is transferred from a reward pool on the blockchain to the edge computing node for computing the solution.

In some embodiments, the method further includes the step of creating the reward pool by submitting, to the blockchain, a funding transaction record encoding a reward deposit.

In some embodiments, the method further includes the step of deploying the smart contract to the blockchain.

In some embodiments, the decentralized computing network includes a plurality of peer nodes including the task initiator node and the edge computing node. The task initiator node is connected to the edge computing node through a secure peer-to-peer connection.

In some embodiments, the solution is encrypted by the edge computing node, a zero-knowledge proof of the solution is provided by the edge computing node, and the encrypted solution and the zero-knowledge proof of the solution are submitted to the smart contract. In some embodiments, the zero-knowledge proof is non-interactive.

In some embodiments, the smart contract is specific to the computation task.

In some embodiments, the method further includes the step of assigning the computation task to a second edge computing node in the decentralized computing network by sending the task information to the second edge computing node. The first solution computed by the first edge computing node is submitted to the smart contract before a second solution computed by the second edge computing node is submitted to the smart contract.

In some embodiments, the method further includes the step of assigning the computation task to a second edge computing node in the decentralized computing network by sending the task information to the second edge computing node. A second solution computed by the second edge computing node is submitted to the smart contract, and a second reward is transferred from the reward pool on the blockchain to the second edge computing node for computing the second solution.

In some embodiments, the computation task is a first computation task, the first computation task is a subtask of a larger computation task, and the edge computing node is a first edge computing node. The method further includes dividing the larger computation task into two or more subtasks, where the two or more subtasks include the first computation task; assigning the two or more subtasks to two or more edge computing nodes including the first edge computing node, to compute two or more subtask solutions respectively; and assembling the two or more subtask solutions into the larger computation task's solution. The reward is transferred from the reward pool to the two or more edge computing nodes that computed the subtask solutions.

In another aspect, one embodiment of the present invention is a task initiator node system in a decentralized computing network, for blockchain and smart contract-supported decentralized computation with on-chain solution verification. The system includes at least one processor and a non-transitory physical medium for storing program code accessible by the processor. The program code when executed by the processor causes the processor to register a computation task on a blockchain by invoking a smart contract on the blockchain. Next, the program code causes the processor to assign the computation task to an edge computing node in the decentralized computing network by sending task information to the edge computing node. Finally, the program code causes the processor to download a solution to the computation task from the blockchain. The solution is computed and submitted to the smart contract by the edge computing node, the solution is verified by the smart contract, and a reward is transferred from a reward pool on the blockchain to the edge computing node for computing the solution.

In some embodiments, the program code when executed by the processor further causes the processor to create the reward pool by submitting, to the blockchain, a funding transaction record encoding a reward deposit.

In some embodiments, the program code when executed by the processor further causes the processor to deploy the smart contract to the blockchain.

In some embodiments, the decentralized computing network includes a plurality of peer nodes including the task initiator node and the edge computing node. The task initiator node is connected to the edge computing node through a secure peer-to-peer connection.

In some embodiments, the solution is encrypted by the edge computing node, a zero-knowledge proof of the solution is provided by the edge computing node, and the encrypted solution and the zero-knowledge proof of the solution are submitted to the smart contract. In some embodiments, the zero-knowledge proof is non-interactive.

In some embodiments, the smart contract is specific to the computation task.

In some embodiments, the program code when executed by the processor further causes the processor to assign the computation task to a second edge computing node in the decentralized computing network by sending the task information to the second edge computing node. The first solution computed by the first edge computing node is submitted to the smart contract before a second solution computed by the second edge computing node is submitted to the smart contract.

In some embodiments, the program code when executed by the processor further causes the processor to assign the computation task to a second edge computing node in the decentralized computing network by sending the task information to the second edge computing node. A second solution computed by the second edge computing node is submitted to the smart contract, and a second reward is transferred from the reward pool on the blockchain to the second edge computing node for computing the second solution.

In another aspect, one embodiment of the present invention is a non-transitory physical storage medium for storing program code accessible by a processor on a task initiator node system in a decentralized computing network, for blockchain and smart contract-supported decentralized computation with on-chain solution verification. The program code when executed by the processor causes the processor to execute the steps described herein.

Edge Computing Nodes with On-Chain Solution Verification

In another aspect, one embodiment of the present invention is a computer-implemented method utilized by an edge computing node in a decentralized computing network, for blockchain and smart contract-supported decentralized computation with on-chain solution verification. The method includes the steps of receiving task information on a computation task from a task initiator node in the decentralized computing network. The computation task is registered on a blockchain by the task initiator node by invoking a smart contract on the blockchain. Next, computing a solution to the computation task. Finally, submitting the solution to the smart contract for verification; and receiving a reward from a reward pool on the blockchain after the solution is verified by the smart contract.

In some embodiments, the reward pool was created by the task initiator node by submitting, to the blockchain, a funding transaction record encoding a reward deposit.

In some embodiments, the decentralized computing network includes a plurality of peer nodes including the task initiator node and the edge computing node. The task initiator node is connected to the edge computing node through a secure peer-to-peer connection.

In some embodiments, the method further includes steps for encrypting the solution and generating a zero-knowledge proof of the solution; and submitting the encrypted solution and the zero-knowledge proof of the solution to the smart contract. In some embodiments, the zero-knowledge proof is non-interactive.

In some embodiments, the submitting the solution to the smart contract for verification includes submitting the solution, by the smart contract, to a second verification smart contract.

In another aspect, one embodiment of the present invention is a system for an edge computing node system in a decentralized computing network, for blockchain and smart contract-supported decentralized computation with on-chain solution verification. The system includes at least one processor and a non-transitory physical medium for storing program code accessible by the processor. The program code when executed by the processor causes the processor to receive task information on a computation task from a task initiator node in the decentralized computing network. The computation task is registered on a blockchain by the task initiator node by invoking a smart contract on the blockchain. Next, the program code causes the processor to compute a solution to the computation task. Finally, the program code causes the processor to submit the solution to the smart contract for verification; and receive a reward from a reward pool on the blockchain after the solution is verified by the smart contract.

In some embodiments, the reward pool was created by the task initiator node by submitting, to the blockchain, a funding transaction record encoding a reward deposit.

In some embodiments, the decentralized computing network includes a plurality of peer nodes including the task initiator node and the edge computing node. The task initiator node is connected to the edge computing node through a secure peer-to-peer connection.

In some embodiments, the program code when executed by the processor further causes the processor to encrypt the solution and generate a zero-knowledge proof of the solution; and submit the encrypted solution and the zero-knowledge proof of the solution to the smart contract. In some embodiments, the zero-knowledge proof is non-interactive.

In some embodiments, the submitting the solution to the smart contract for verification includes submitting, by the smart contract, the solution to a second verification smart contract.

In another aspect, one embodiment of the present invention is a non-transitory physical storage medium for storing program code accessible by a processor on an edge computing node system in a decentralized computing network, for blockchain and smart contract-supported decentralized computation with on-chain solution verification. The program code when executed by the processor causes the processor to execute the steps described herein.

Task Initiator Nodes with Off-Chain Solution Verification

In another aspect, one embodiment of the present invention is a computer-implemented method utilized by a task initiator node in a decentralized computing network, for blockchain and smart contract-supported decentralized computation with off-chain solution verification. The method includes steps of registering a computation task on a blockchain by invoking a smart contract on the blockchain. Next, assigning the computation task to an edge computing node in the decentralized computing network by sending task information to the edge computing node. Then, receiving a solution to the computation task from the edge computing node. The solution is determined by the edge computing node, and a function of the solution is submitted by the edge computing node to the smart contract on the blockchain. Finally, verifying the solution by determining whether the solution is valid; and in response to determining that the solution is valid, marking the solution as solved by notifying the smart contract to transfer a reward to the edge computing node from a reward pool on the blockchain.

In some embodiments, the method further includes a step for creating the reward pool by submitting, to the blockchain, a funding transaction record encoding a reward deposit. In some embodiments, the reward deposit is larger than a collateral threshold.

In some embodiments, the decentralized computing network includes a plurality of peer nodes including the task initiator node and the edge computing node. The task initiator node is connected to the edge computing node through a secure peer-to-peer connection.

In some embodiments, the function of the solution is a hash function of the solution.

In some embodiments, in response to notifying the smart contract to transfer a reward to the edge computing node from a reward pool on the blockchain, a reputation score of the task initiator is updated.

In some embodiments, the method further includes a step for assigning the computation task to a second edge computing node in the decentralized computing network, by sending the task information to the second edge computing node. The first solution computed by the first edge computing node is received by the task initiator node before a second solution computed by the second edge computing node is received by the task initiator node.

In some embodiments, the method further includes a step of assigning the computation task to a second edge computing node in the decentralized computing network, by sending the task information to the second edge computing node. A second solution computed by the second edge computing node is received and verified by the task initiator node, and a second reward is transferred from the reward pool on the blockchain to the second edge computing node for computing the second solution.

In some embodiments, the computation task is a first computation task, the first computation task is a subtask of a larger computation task, and the edge computing node is a first edge computing node. The method further includes dividing the larger computation task into two or more subtasks, where the two or more subtasks include the first computation task; assigning the two or more subtasks to two or more edge computing nodes including the first edge computing node, to compute two or more subtask solutions respectively; and assembling the two or more subtask solutions into the larger computation task's solution. The reward is transferred from the reward pool to the two or more edge computing nodes that computed the subtask solutions.

In another aspect, one embodiment of the present invention is a system for a task initiator node system in a decentralized computing network, for blockchain and smart contract-supported decentralized computation with off-chain solution verification. The system includes at least one processor and a non-transitory physical medium for storing program code accessible by the processor. The program code when executed by the processor causes the processor to register a computation task on a blockchain by invoking a smart contract on the blockchain. Next, the program code causes the processor to assign the computation task to an edge computing node in the decentralized computing network by sending task information to the edge computing node. Then, the program code causes the processor to receive a solution to the computation task from the edge computing node. The solution is determined by the edge computing node, and a function of the solution is submitted by the edge computing node to the smart contract on the blockchain. Finally, the program code causes the processor to verify the solution by determining whether the solution is valid; and in response to determining that the solution is valid, mark the solution as solved by notifying the smart contract to transfer a reward to the edge computing node from a reward pool on the blockchain.

In some embodiments, the program code when executed by the processor further causes the processor to create the reward pool by submitting, to the blockchain, a funding transaction record encoding a reward deposit. In some embodiments, the reward deposit is larger than a collateral threshold.

In some embodiments, the decentralized computing network includes a plurality of peer nodes including the task initiator node and the edge computing node. The task initiator node is connected to the edge computing node through a secure peer-to-peer connection.

In some embodiments, the function of the solution is a hash function of the solution.

In some embodiments, in response to notifying the smart contract to transfer a reward to the edge computing node from a reward pool on the blockchain, a reputation score of the task initiator is updated.

In some embodiments, the program code when executed by the processor further causes the processor to assign the computation task to a second edge computing node in the decentralized computing network, by sending the task information to the second edge computing node. The first solution computed by the first edge computing node is received by the task initiator node before a second solution computed by the second edge computing node is received by the task initiator node.

In some embodiments, the program code when executed by the processor further causes the processor to assign the computation task to a second edge computing node in the decentralized computing network, by sending the task information to the second edge computing node. A second solution computed by the second edge computing node is received and verified by the task initiator node, and a second reward is transferred from the reward pool on the blockchain to the second edge computing node for computing the second solution.

In another aspect, one embodiment of the present invention is a non-transitory physical storage medium for storing program code accessible by a processor on a task initiator node system in a decentralized computing network, for blockchain and smart contract-supported decentralized computation with off-chain solution verification. The program code when executed by the processor causes the processor to execute the steps described herein.

Edge Computing Nodes with Off-Chain Solution Verification

In another aspect, one embodiment of the present invention is a computer-implemented method utilized by an edge computing node in a decentralized computing network, for blockchain and smart contract-supported decentralized computation with off-chain solution verification. The method includes the steps of receiving task information on a computation task from a task initiator node in the decentralized computing network. The computation task has been registered on a blockchain by the task initiator node by invoking a smart contract on the blockchain. Next, computing a solution to the computation task. Finally, submitting a function of the solution to the smart contract; and receiving a reward from a reward pool on the blockchain after the solution is verified by the task initiator node.

In some embodiments, the reward pool was created by the task initiator node by submitting, to the blockchain, a funding transaction record encoding a reward deposit. In some embodiments, the reward deposit is larger than a collateral threshold.

In some embodiments, the decentralized computing network includes a plurality of peer nodes including the task initiator node and the edge computing node. The task initiator node is connected to the edge computing node through a secure peer-to-peer connection.

In some embodiments, the function of the solution is a hash function of the solution.

In another aspect, one embodiment of the present invention is an edge computing node system in a decentralized computing network, for blockchain and smart contract-supported decentralized computation with off-chain solution verification. The system includes at least one processor and a non-transitory physical medium for storing program code accessible by the processor. The program code when executed by the processor causes the processor to receive task information on a computation task from a task initiator node in the decentralized computing network. The computation task has been registered on a blockchain by the task initiator node by invoking a smart contract on the blockchain. Next, the program code causes the processor to compute a solution to the computation task. Finally, the program code causes the processor to submit a function of the solution to the smart contract; and receive a reward from a reward pool on the blockchain after the solution is verified by the task initiator node.

In some embodiments, the reward pool was created by the task initiator node by submitting, to the blockchain, a funding transaction record encoding a reward deposit. In some embodiments, the reward deposit is larger than a collateral threshold.

In some embodiments, the decentralized computing network includes a plurality of peer nodes including the task initiator node and the edge computing node. The task initiator node is connected to the edge computing node through a secure peer-to-peer connection.

In some embodiments, the function of the solution is a hash function of the solution.

In another aspect, one embodiment of the present invention is a non-transitory physical storage medium for storing program code accessible by a processor on an edge computing node system in a decentralized computing network, for blockchain and smart contract-supported decentralized computation with off-chain solution verification. The program code when executed by the processor causes the processor to execute the steps described herein.

Yet other aspects of the present invention include methods, processes, and algorithms comprising the steps described herein, and also include the processes and modes of operation of the systems and servers described herein. Other aspects and embodiments of the present invention will become apparent from the detailed description of the invention when read in conjunction with the attached drawings.

BRIEF DESCRIPTION OF THE DRAWINGS

Embodiments of the present invention described herein are exemplary, and not restrictive. Embodiments will now be described, by way of examples, with reference to the accompanying drawings, in which:

FIG. 3 is an exemplary block diagram of various layers within a THETA decentralized network infrastructure, in accordance with some embodiments of the present invention;

DETAILED DESCRIPTION OF THE INVENTION

Figure 1A:
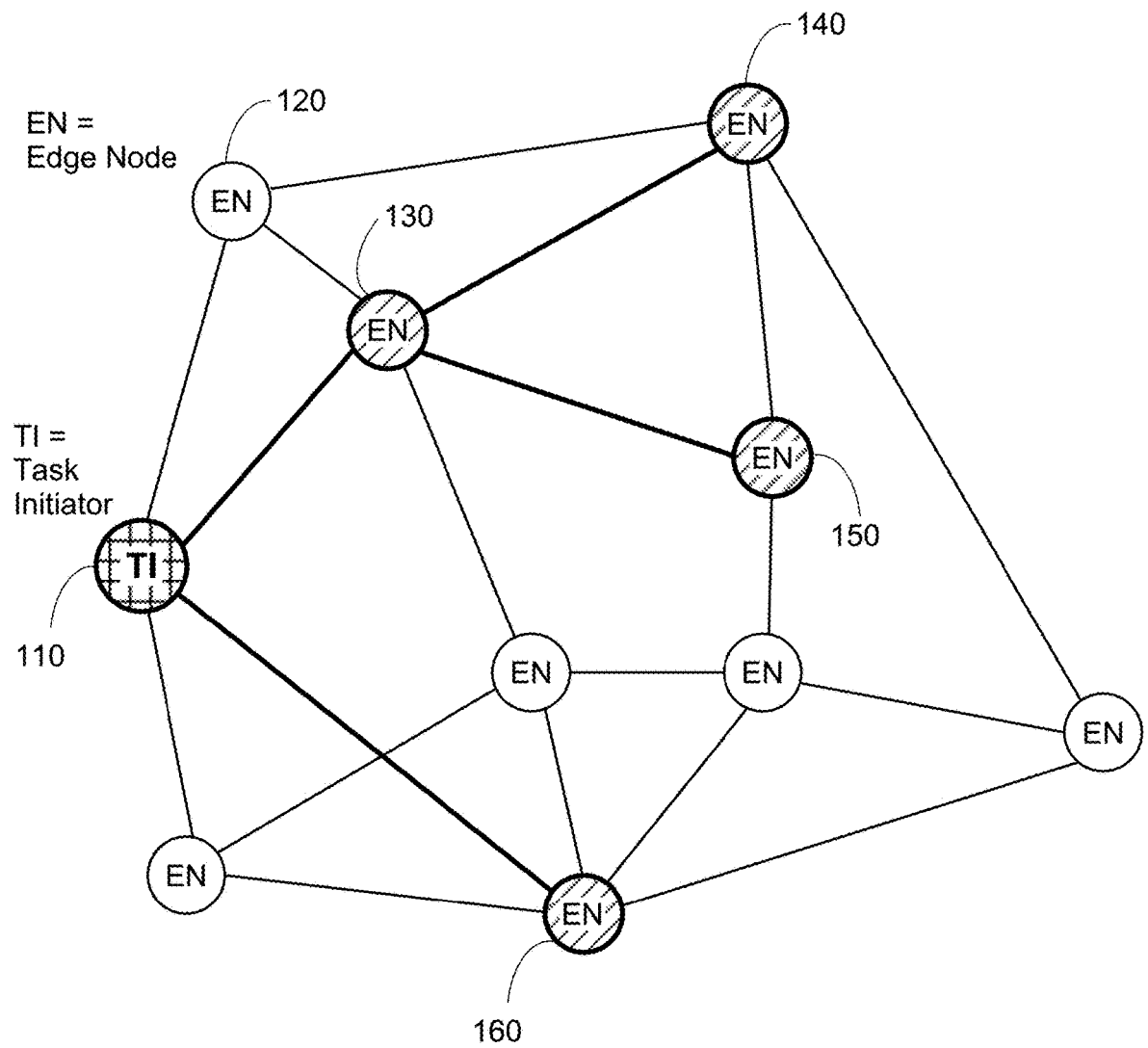
FIG. 1A is an illustrative network diagram showing a peer-to-peer network architecture for decentralized computing, according to one embodiment of the present invention.

In the following description, for purposes of explanation, numerous specific details are set forth in order to provide a thorough understanding of the invention. It will be apparent, however, to one skilled in the art that the invention can be practiced without these specific details. In other instances, structures, devices, activities, and methods are shown using schematics, use cases, and/or flow diagrams in order to avoid obscuring the invention. Although the following description contains many specifics for the purposes of illustration, anyone skilled in the art will appreciate that many variations and/or alterations to suggested details are within the scope of the present invention. Similarly, although many of the features of the present invention are described in terms of each other, or in conjunction with each other, one skilled in the art will appreciate that many of these features can be provided independently of other features. Accordingly, this description of the invention is set forth without any loss of generality to, and without imposing limitations upon the invention.

THETA is a trademark name carrying embodiments of the present invention, and hence, the aforementioned trademark name may be interchangeably used in the specification and drawings to refer to the products/services offered by embodiments of the present invention. The term THETA may be used in this specification to describe the overall decentralized computing network or platform, the public ledger system for rewarding computation resource sharing, as well as the company providing said network, platform, system, or services. With reference to the figures, embodiments of the present invention are now described in detail.

Overview

Broadly, the present invention relates to methods and systems for an incentivized and decentralized peer-to-peer network for bandwidth, data, and/or computational resource sharing. More specifically, embodiments of the present invention are directed to an incentivized and decentralized computing network or platform (hereafter the "THETA edge computing platform", "THETA edge computing network", or "THETA edge network") in which peer-to-peer (P2P) computational resource sharing is facilitated through smart contracts on a blockchain (hereafter the "THETA blockchain", or "THETA ledger system") maintained by a blockchain network (hereafter the "THETA blockchain network"). In the present disclosure, the term "THETA network" may refer to the THETA edge network, the THETA blockchain network, or combinations thereof, as would be clear to persons of ordinary skills in the art within the context of the detailed descriptions. In various embodiments, a smart contract-based infrastructure implements functionalities including, but not limited to, task assignment, data distribution, solution verification, reward pooling, and incentive micropayments. That is, peer edge nodes in the THETA network may invoke, via blockchain nodes, decentralized applications (DApps) in the form of smart contracts on the THETA blockchain to share redundant or unused processing power, to function as "edge computing nodes" or "edge workers", to support other peer nodes' computational demands by exploiting otherwise wasted idle CPU cycles, and to automatically receive rewards for the work done for other peer nodes.

A peer-to-peer mesh network can allow interconnected peer nodes to share resources with each other without the use of a centralized managing server or stable host. The THETA network, as described in issued U.S. Pat. No. 10,771,524 (Methods and Systems for a Decentralized Data Streaming and Delivery Network, incorporated by reference in its entirety herein), enables the sharing of bandwidth by edge cacher nodes, to cache and/or relay video and other data, in a network infrastructure that is scalable to millions of concurrent users through native THETA blockchain protocol-level support for cryptocurrency micropayments. As bandwidth sharing utilizes minimal Central Processing Unit (CPU) and Graphical Processing Unit (GPU) resources, the present disclosure provides an additional framework to enable edge nodes to distributively perform computationally intensive tasks, such as video transcoding, drug design and discovery-related computations, and so forth.

In one aspect, embodiments of the present invention establish a self-organized and dynamic universal edge computing platform including task initiator nodes and edge computing nodes that interact directly with each other and with smart contracts hosted by the THETA blockchain. The THETA blockchain includes a decentralized public ledger system that builds upon a multi-level Byzantine Fault Tolerant (BFT), Proof-of-Stake consensus mechanism carried out by a small number of validator nodes and a large number of guardian nodes in the THETA blockchain network. The THETA blockchain can provide native protocol level support for resource-orientated micropayment pools and smart contracts for computation task management and solution verification. A smart contract can include a self-executing contract or self-enforcing agreement in the form of computer programming codes or instructions managed by and stored on a blockchain. A smart contract represents a decentralized application (DApp) that is executed based on predetermined conditions or based on an agreement between participating parties. In various embodiments of the present invention, one or more smart contracts may be called or triggered to register computation tasks from task initiators, to verify solutions received from edge computing nodes, and to distribute token awards, for example from a reward pool, to edge computing nodes once solutions are verified. Depending on its size and/or format, the disclosed systems can verify a solution on-chain through a verifier smart contract, or off-chain through the original task initiator.

The THETA decentralized computing platform's decentralized nature and low barrier to deployment allow peers to use the system for computation tasks of both large and small scales, without the need for specialized project servers for task allocation and management. For example, Internet of Things (IoT) devices without much computation, storage, and/or battery power may delegate small computation tasks to more capable neighbors close by, individual users who do not own professional software on powerful enough personal computers can put up simple image rendering tasks for individual edge workers, developers can tap into the system to delegate computation intensive tasks such as machine learning model training and evaluation to hundreds of edge workers, gaming and video streaming platforms that already have millions of concurrently active users can distribute rendering and transcoding jobs among its own users seamlessly, and large-scale scientific projects such as SETI@home and Folding@home are inherently compatible with the THETA platform.

Furthermore, as edge computing nodes can be automatically awarded and incentivized for their work, participants in the THETA edge computing network may be more likely to provide significant contributions in a reliable manner when compared to existing crowd-sourcing donation platforms that run on volunteer computers, with many more edge computing nodes willing to participate. Additional protection against malicious task initiators can further be provided by the smart contracts via techniques such as collateral locking and reputation ranking.

In short, the THETA decentralized edge computing platform combines the advantages of P2P distributed computing techniques and blockchain-based smart contracts to achieve high scalability and high resource availability, and attains the following characteristics:

Organic network growth over full decentralization: the THETA network is self-organizing, self-adaptive, self-evolving, highly available, scalable, and robust, with minimal operational overhead, and with plug and play capabilities where a peer node (e.g., a task initiator or an edge worker) can join or leave at any time;

Incentivization to encourage the abundance and diversity of computation resources: the THETA network provides blockchain and smart-contract supported incentivization for task completion, with high transaction-throughput micropayments enabled; and Universality: the THETA network can support a wide range of computational tasks with configurable task metadata and/or parameters on input/output data size and format, solution accuracy, precision, and computation delay, etc., and further with options for task batching and subdivision.

In what follows, a THETA decentralized edge computing platform and infrastructure are disclosed, the software architecture of individual nodes within the THETA edge network are presented, and designs for the THETA blockchain network, ledger system, and smart contracts are also disclosed.

Peer-to-Peer Decentralized Computing Network

In some decentralized computing projects, individual nodes or users are connected to a central server directly to obtain allocation and assignment of computation tasks. In some cases, individual users in a local area network may function as a worker farm to solve tasks from a central server. By comparison, nodes within a peer-to-peer (P2P) distributed computing network communicate directly with each other, without the need of a central server. One advantage of P2P resource sharing is availability and robustness. Peers can come and go at any time, and tasks can be batched or subdivided depending on resource availabilities.

FIG. 1A shows a diagram for at least a portion of an illustrative peer-to-peer network architecture for a THETA decentralized edge computing platform 100, according to one embodiment of the present invention. In particular, THETA network 100 may include multiple edge nodes ("EN") connected via P2P connections, including one or more task initiators ("TI") such as 110, and one or more edge workers or edge computing nodes such as 120, 130, 140, 150, and 160. In various embodiments, edge nodes in THETA network 100 may use any peer discovery techniques to self-organize into a semi-randomly connected peer-to-peer network based on one or more parameters, including, but not limited to, network distance, geo-locations, and/or other system specification and availabilities. Exemplary peer-discovery techniques include but are not limited to, distributed hash tables, use of tracker servers, Domain Name System (DNS) query-based initial peer list bootstrapping, combinations thereof, and/or the like.

In the present disclosure, "edge nodes" refer to individual peer nodes in the THETA network. As previously discussed, the THETA network may implement edgecast functionalities for data and bandwidth resource sharing, as well as edge compute functionalities for computation resource sharing. Thus, an edge node may be implemented to function as one or more of an edge cacher, a viewer, a task initiator, or an edge worker. An edge cacher node shares its storage and bandwidth resources with other peers; a viewer node downloads data from edge cacher nodes; a "task initiator" or "task server" node uses the THETA network to solve its computational tasks; while an "edge worker" or "edge computing node" is a generic computational platform or generic end user client that shares and contributes its processing power and CPU time to solve computational tasks registered by task initiators in exchange for rewards. In what follows, unless otherwise specified, the terms "edge node", "edge computing node", and "edge worker" may be used interchangeably, with the understanding that an edge node can implement one or more protocols to share with others, or receive from others, one or more types of resources. Similarly, unless otherwise specified, the terms "THETA network", "THETA decentralized network", "THETA edge computing platform", "THETA edge computing network", "THETA edge network", and "THETA edgecast network" are used interchangeably, with the understanding that the THETA network is designed for the universal sharing of different types of resources among its member peer nodes.

In some embodiments, an edge computing node such as 130 in FIG. 1A is a generic computational platform that hosts various software including a solver for tasks issued by task initiator 110. In some embodiments, dedicated programming instructions, add-ons, plugins, or software packages, and/or standalone software applications may be provided to edge worker 110 by the THETA platform for use in solving one or more tasks. In some embodiments, a user client module, a library, or a software development kit (SDK) may be provided, integrated directly into, and interface with edge computing node 130's existing computing environments and/or installed proprietary software to solve different types of computation tasks.

Once a task is solved by edge computing node 130, the edge computing node may upload the solution directly to task initiator 110, or indirectly through another intermediate node or network, and in turn be rewarded once the solution has been verified. In some embodiments, each edge computing node may have one or more associated availability scores indicating its up time, response time, its "skill level" or hardware specification (e.g., processor number, speed, memory size, bandwidth, memory storage, combinations thereof, and/or the like), and other characteristics such as computation history. Such availability scores may be used for task/job matching, or task allocation and assignment by task initiators.

Task initiators are users or user computers that utilize the THETA edge computing platform to solve their computational tasks. In the exemplary setup shown in FIG. 1A, edge nodes that are actively participating in edge computing for task initiator 110 are shaded in dashed lines. Task initiator 110 posts tasks, edge computing nodes 130 and 160 download and solve such tasks, and edge computing node 130 may further distribute computation sub-tasks to other peers 140 and 150. Task initiator 110 may register tasks on the THETA blockchain and provide rewards to edge workers, including 130 and 160, who complete the tasks. A reward may be in the form of a cryptocurrency token such as a THETA token, a THETA FUEL (TFUEL) gas token, any other token/cryptocurrency, or any form of an IOU that may be redeemable at a later time. In some embodiments, a task initiator may have one or more associated scores indicating its task load, priority, urgency, delay requirement, reward amount and history, trustworthiness, and similar characteristics. Such scores may be used for node/task/job matching, task allocation and assignment, and/or tier-ed rewarding strategies and payment pool creation and management. In some embodiments, a task initiator may include local computation modules for verifying the quality of a solution, for example using measures for correctness, accuracy, error residual, confidence levels, and the like, depending on the nature of the original computation task.

In what follows, both task initiators and edge computing nodes are discussed in exemplary embodiments, for illustrative purpose only, without limiting the scope of the methods, systems, and devices as disclosed herein, which are capable of distributing or performing computation tasks with various latency, accuracy, or precision requirements. "Computation", "computation task", "computational task", or simply "task" refers to any computer-executed processes that use multiple CPU cycles to execute a given set of computation instructions, to convert a set of input data into a set of output data, and/or to compute a "solution" to a proposed or registered problem. Exemplary computation tasks include, but are not limited to, any one or combination of data cleaning, search, comparison, sampling, interpolation, extrapolation, transformation, transcoding, equation solving, statistical analysis, numerical modeling, and machine model training and validation. A solution to a task may take on different alphanumerical formats and sizes depending on the nature of the task, and a solution verification process may check whether the solution meets one or more given conditions or requirements. For example, an integer factorization task may result in a unique deterministic result in the form of numerical tuples that can be multiplied together to verify its correctness. On the other hand, a video transcoding task may have multiple video output files as the solution, each with a different resolution. Each video file may be sampled to verify its resolution meets an initial requirement of the task, while being a non-unique output file at that particular resolution, depending on the transcoding technique used. Some tasks may be batched together, while some may be subdivided. For example, an edge computing node such as 130 in FIG. 1A may further distribute computation sub-tasks to its peers 140 and 150, and each of edge computing nodes 130, 140, and 150 may be rewarded proportionally for its participation in completing a computation task as originally proposed by task initiator 110, once a solution or sub-solution is verified.

Moreover, a task initiator or an edge computing node may receive, store, and transmit chunks, fragments, slices, or batches of input data, output data, data hashes, problem stems, and/or task metadata, and may support "range requests" to avoid the need to download or upload a relatively large chunk of data when only a relatively small fraction is needed.

As discussed, although individual nodes are labeled as either a task initiator or an edge computing node in FIG. 1A, in some embodiments, a peer node in the THETA network may be configured to function as both a task initiator and an edge computing node. For example, edge computing node 130 may poll several task initiators including task initiator 110 for tasks to solve, and itself may also be polled by edge computing nodes 140 and 150 for tasks or sub-tasks to solve, depending on the priority, urgency, difficulty level of the problem, and the amount of reward offered. In another example, edge nodes 140 and 150 may exchange computation resources, where each node uses a software that the other node does not have to complete a task for the other node.

Figure 1B:
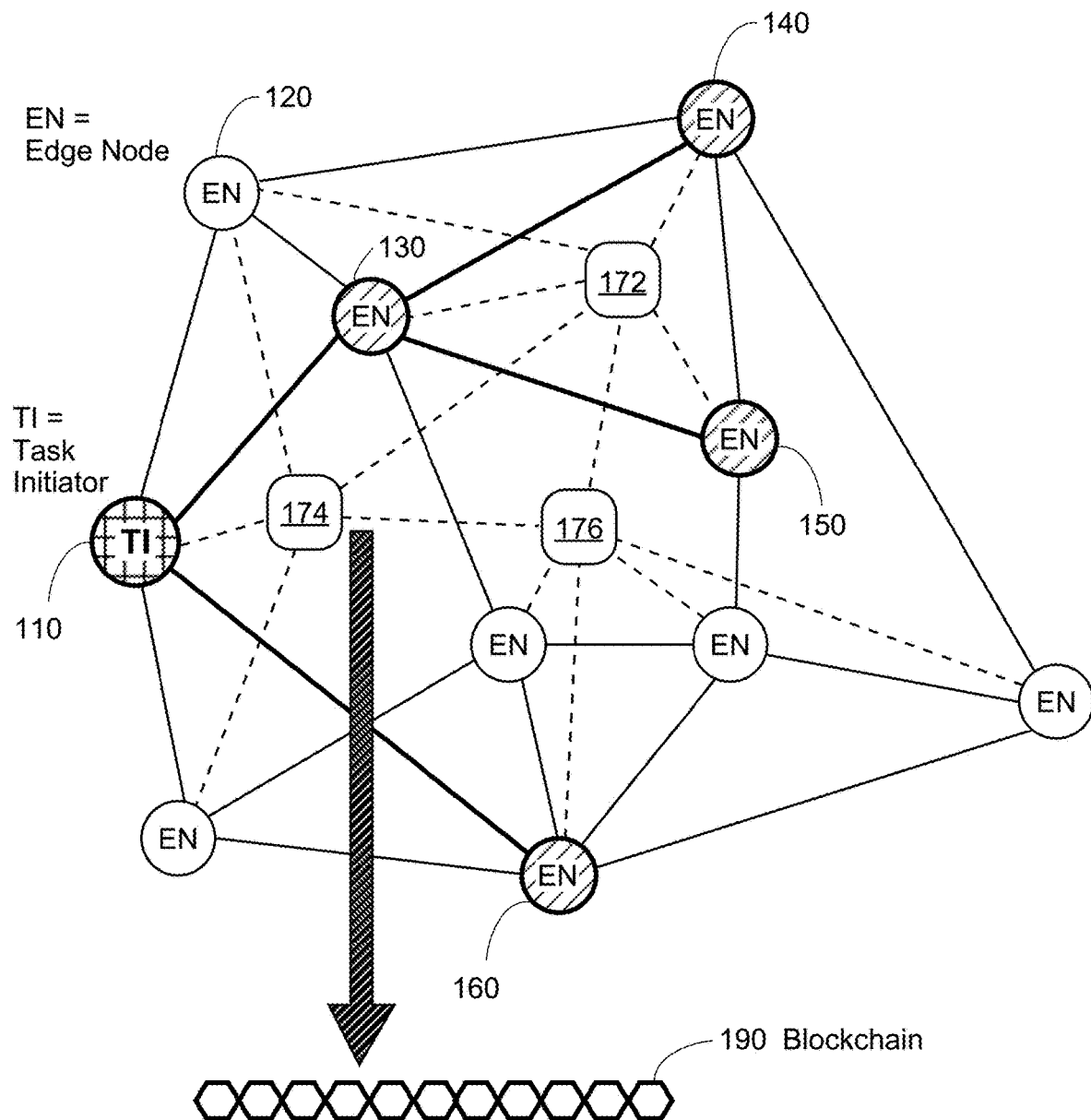
FIG. 1B is an illustrative network diagram showing a blockchain and smart contract-supported decentralized edge computing platform, according to one embodiment of the present invention.

To facilitate task allocation, assignment, solution generation, verification and rewarding, a THETA blockchain network may provide native protocol level support for reward pools and smart contracts. FIG. 1B is an illustrative network diagram 170 showing the decentralized edge computing platform 100 as supported by a smart contract-enabled blockchain 190, according to one embodiment of the present invention. As discussed in more detail in reference to FIG. 3, a blockchain such as 190 can include a list of public transaction records, or bocks, linked through cryptography, and typically managed by a blockchain peer-to-peer network, as illustrated by blockchain nodes 172, 174, and 176. Each edge node in the THETA decentralized network is connected to at least one blockchain node in FIG. 1B. In some embodiments, edge nodes may function as blockchain nodes and may participate in transaction verification, block assembly, and smart contract execution as well. In some embodiments, edge nodes may be rewarded for being up and running within the THETA network. While some payment systems may use a central authority to verify and clear transactions to maintain trust, a blockchain ledger can achieve global, decentralized consensus without such a central authority. The THETA blockchain uses a Proof-of-Stake (PoS) distributed consensus approach, where a blockchain node may mine or validate a block according to various combinations of random selection, wealth and/or age (i.e., the "stake"). For example, a stake may be a fixed amount of cryptocurrency funds (e.g., THETA tokens) that is committed to the blockchain by a miner in order to participate in block creation and validation. The more stake a miner commits, the more mining power it may have. In various embodiments, other types of block consensus mechanisms such as Proof-of-Work, Proof-of-Engagement, etc. may be used instead. Furthermore, smart contracts are immutable computer programs executed and ran deterministically on blockchain nodes. Once deployed, a smart contract can be executed but cannot be changed. Each edge node in the THETA decentralized network may access smart contracts deployed on blockchain 190 to participate in distributed computing as disclosed herein.

Figure 2:
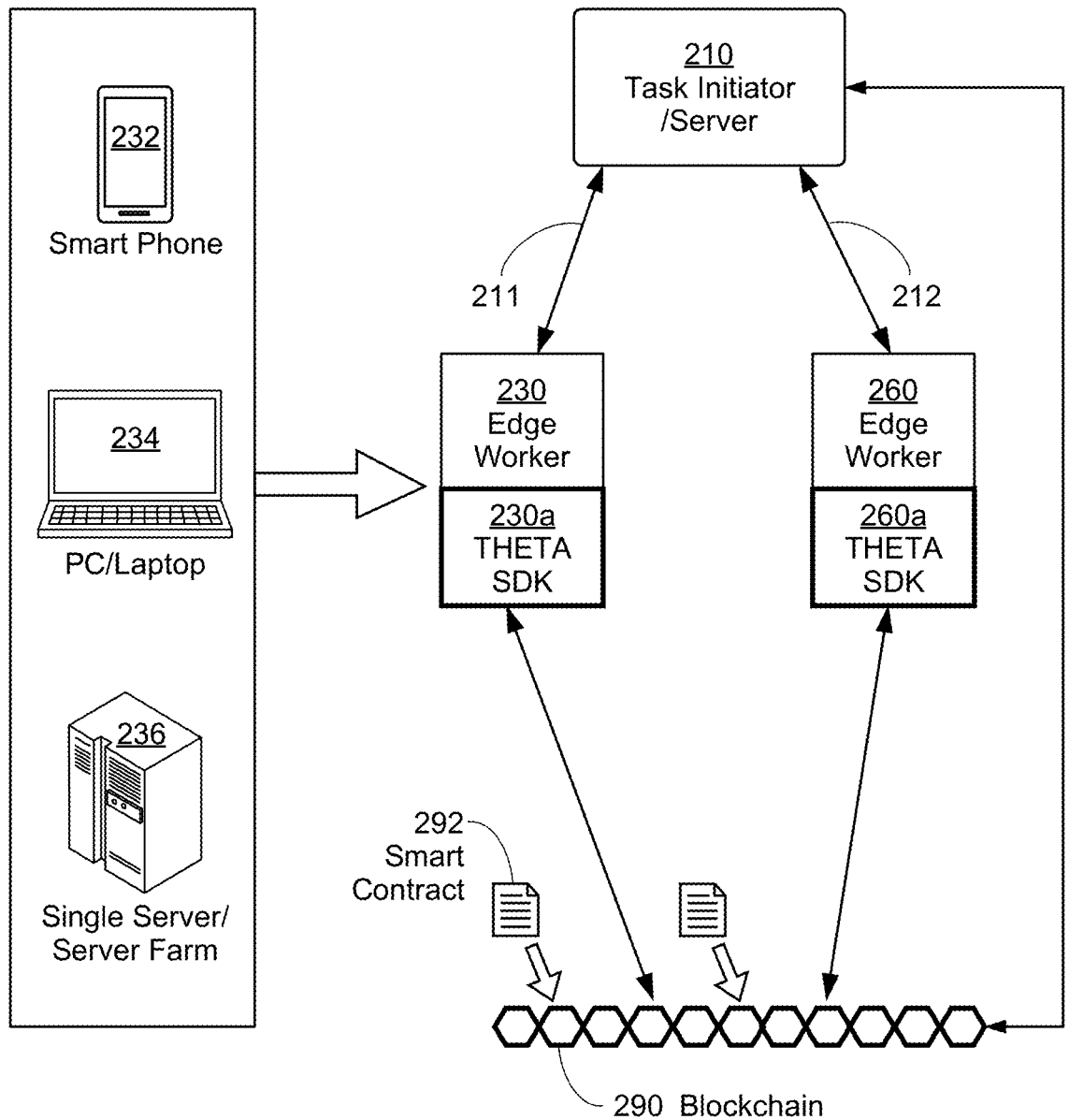
FIG. 2 is an illustrative architecture diagram showing part of a blockchain and smart contract-supported decentralized edge computing platform, according to one embodiment of the present invention.

FIG. 2 is an illustrative network diagram showing an incentivized, decentralized THETA computing platform 200, according to one embodiment of the present invention. In this illustrative example, task initiator or task server 210 is connected to edge worker nodes 230 and 260 through P2P connections 211 and 212 respectively. In one exemplary embodiment, task initiator 210 may be a peer edge node, such as when one peer relies on another peer for the transcoding of video data. In another exemplary embodiment, task initiator 210 may be an institutional server cluster from large projects such as SETI@home, FightAids@home, or Folding@home.

In various embodiments, each component or node within THETA network 200 may be implemented as different types of computing clients or modules, such as stand-alone edge computing clients, WebApps, SDKs, and the like. For example, edge node 230 may be implemented as a dedicated software module that runs on any suitable device including, but not limited to, mobile computing devices such as tablets or smart phones 232, personal computers or desktops 234, game consoles, and server machines 236. Other examples of suitable computing entities are provided with reference to FIGS. 10 and 11. Edge node 230 may offer a portion or all its local idle computational power for sharing, with the actual amount of computational resource needed by a requested task configured dynamically. Here computational power or computational resource may refer to any generic or specialized processors or accelerators, CPU or GPU cycles, cores, threads, transient or non-transient storages, data bus usages, or the like, that may be used for the completion of a computing task. In some embodiments, edge nodes 230 and 260 may include different types of edge computing software or clients capable of processing different task types with different difficulties levels, limitations, constraints, conditions, priorities, urgencies, or other similar characteristics. In some embodiments, each of edge nodes 230 and 260 may implement an end-user software using a THETA Software Development Kit (SDK) such as 230a and 260a, so that an edge computing node may utilize pre-existing task solving software or computing environments. That is, the THETA SDK may be integrated into a third-party application or device so that a task may be solved through the third-party application when necessary. An SDK is a set of software development tools or programming packages for creating applications for a specific platform. An SDK may be compiled as part of the developed application to provide dedicated interfaces and functionalities. Alternatively, an SDK may be an individually compiled module, incorporable into an existing application or computing environment as a plug-in, add-on, or extension in order to add specific features to the application without accessing its source code.

As discussed previously, task initiator nodes and edge computing nodes may utilize any peer discovery methods to self-organize into semi-randomly connected networks based on node specifications, bandwidth availability and cost, network distance/geo-distance, and/or other factors. For example, each edge computing node such as 230 and 260 in FIG. 2 may have one or more associated availability scores, indicating its up time, response time, its "skill level" or hardware spec and/or capabilities, and other characteristics such as computation history and reliability. Each task initiator such as 210 in FIG. 2 may have one or more associated scores as well, indicating its task load, priority, urgency, delay requirement, reward amount and history, trustworthiness, and similar characteristics. Such scores may be used for node/task/job matching, and/or task allocation and assignment, and/or tier-ed rewarding strategies and payment pool creation and management. In some embodiments, network or geo-distances may be estimated and edge nodes within a certain threshold distance may be selected for P2P resource sharing. For example, task initiator 210 may utilize the connectivity between IP addresses collected in the past to analyze and select candidate edge computing nodes. In some embodiments, peer selection and task assignments are made independent of the distance between nodes, especially with tasks that can tolerate high computation and transmission delays.

In some embodiments, edge computing nodes with specs above a certain threshold may be made available for particular task initiators known to host difficult tasks that require more than a threshold number of parallel processors, a threshold number of CPU cycles, with specific needs on local storage or computation delay, with additional requirements on solution precision, or the like. In some embodiments, some task initiators and/or edge computing nodes may be partitioned into clusters, for example, based on task type, and to share rewards from the same reward pool. In some embodiments, edge computing nodes are not partitioned into clusters, to improve robustness of the network at least because the network may continue to function if any task initiator or edge computing node leaves the network. As more edge nodes are added to the network, the network may become more efficient and may achieve higher computation offload. In some embodiments such as shown in FIG. 2, edge nodes 230 and 260 may connect directly with task initiator server 210, which may keep track of active edge computing nodes. For example, an active edge computing node 230 may maintain a socket connection with task server 210 and send heartbeat signals consistently. If task initiator server 210 does not receive a heartbeat for a certain amount of time, it may consider that peer node 230 as having left the network.

To facilitate task registration, solution, verification, and rewarding, each of task initiator 210 and edge computing nodes 230 and 260 may have direct access to a THETA blockchain 290 that hosts one or more smart contracts such as 292. A blockchain can include a list of public transaction records, which are data structures that encode the transfer of value from one user to another. Transactions can be structured and bundled into blocks (e.g., through a Merkle tree), and blocks are chained through cryptography, and in turn managed by a blockchain peer-to-peer network with protocols for inter-node communication and block validations, to achieve global, decentralized consensus without a central authority. A smart contract is a decentralized application stored and run on a blockchain. When a transaction has a smart contract address as a destination, the smart contract is executed and a function as specified by the transaction is called. In embodiments of the present invention, one or more smart contracts deployed on the THETA blockchain may be invoked, called, or triggered to register computation tasks from task initiators, to verify solutions received from edge computing nodes, and to distribute token awards from a reward pool to edge computing nodes once solutions are verified. Depending on its size and/or format, a solution may be verified on-chain through a verifier smart contract, or off-chain by the original task initiator. More details on the THETA blockchain are provided in the next section.

In summary, the THETA decentralized edge computing platform includes three main types of participants:

Task Initiators, which are "users" who utilize the THETA edge computing platform to solve their computational tasks. A task initiator posts tasks for edge computing nodes to download and solve. Task initiators are also responsible for registering the tasks on the THETA blockchain and providing rewards (e.g., in THETA tokens, TFUEL tokens, another token or cryptocurrency, service, or redeemable IOUs) for each task. The tasks may range from solving a set of equations, finding novel protein structure to help fight COVID-19, to transcoding a video, and thousands of other applications that can leverage a network of distributed edge computing devices.

Edge Computing Nodes, which may poll task initiators to obtain tasks. An edge node is a generic computational platform which can host various software including the solver for the tasks issued by the task initiator. Once a task is solved by an edge node, the edge node can upload the solution to the blockchain, to the task initiator, or to other virtual or physical storage entities. Tasks may be assigned to edge computing nodes in various ways. For example, in some embodiments, tasks may be published by the task initiator, and edge computing nodes may "pull" tasks to work on. Similarly, in other embodiments, task initiators may instead "push" tasks to edge computing nodes that have indicated their interest to work on certain task types. Various other methods of task assignment are also within the scope of the present invention.

Smart Contracts, as hosted by a blockchain. For example, one smart contract may act as a trustless escrow for task rewards, by establishing a reward payment pool. Once a submitted solution is verified, the reward may be transferred to the solver (i.e., an edge node) automatically THETA Blockchain-Based Ledger System FIG. 3 is a block diagram 300 of various layers within a THETA decentralized network infrastructure in accordance with some embodiments of the present invention. On a high level, several parties may be involved in the establishment and evolution of the THETA generalized data delivery and computing ecosystem, including but not limited to, Decentralized Application (DApp) developers, THETA Labs, and partners. As used herein, THETA Labs refers to the organization that provides protocol level design and support for the network, platform, system, and services as disclosed herein.

First, a THETA protocol layer 310 as designed and developed by THETA Labs provides the framework for enabling blockchain operations as well as data delivery and resource sharing capabilities. In some embodiments, THETA protocol layer 310 may include a ledger protocol 312, a decentralized computation protocol 314, and a decentralized data delivery protocol 316. These protocols may work together to implement one or more of transaction verification, block assembly and consensus, cryptocurrency token economics, and decentralized applications that may assign, allocate, or share different types of resources via smart contracts enabled by the THETA blockchain. Exemplary embodiments of decentralized computation protocol 314 are presented in more details in the next sections with references to FIGS. 4-7B. Exemplary embodiments of the decentralized data delivery protocol 316 are explained in issued U.S. Pat. No. 10,771,524 (Methods and Systems for a Decentralized Data Streaming and Delivery Network, incorporated by reference in its entirety herein).

A blockchain is a decentralized, distributed, public ledger, in the form of a list of public transaction records or transactions that are written into blocks of data and linked through cryptography. A blockchain is typically managed through a peer-to-peer network, where each peer node maintains a full or partial copy of the blockchain. Decentralized, cryptographic consensus among peers leads to immutability of the blockchain, where a transaction record cannot be modified, once written into a block and the block is verified and accepted by peers. Block mining and validation refer to specific steps in the distributed consensus process that are required whenever a new transaction is added to the blockchain.

More specifically, a transaction is a data structure or signed message that is transmitted through a blockchain network of peer nodes, and recorded on the blockchain. A transaction may encode or record the transfer of value between different parties when used for payment, with one or more transaction inputs and one or more transaction outputs viewed as debits and credits against different entities involved in the transaction. The output of one transaction may be used as the input of another transaction. A user's balance, as recorded on a blockchain, is an aggregation of all transaction outputs controlled by the user through a cryptographic key, and that has not been spent as the input to other transactions yet. Furthermore, a transaction may contain a data payload for smart contract invocation or other similar purposes.

While some payment systems require a central authority to verify and clear transactions to maintain trust, a THETA blockchain ledger system such as implemented using ledger protocol 312 can achieve global, decentralized consensus without such a central authority. That is, even though fiat currencies are often stored and transmitted digitally, fraud, double-spending, and other issues and disputes are prevented by clearing and settling electronic transfers or payments through centralized authorities such as individual banking institutions or clearing houses. By comparison, a blockchain-based cryptocurrency payment system relies on cryptography and distributed consensus among all peers for trusting the legitimacy of a transaction without dependence on third-parties. A blockchain is immutable, where modifications to transaction data may be nearly impossible, a property making it suitable for use by cryptocurrencies as a payment method in the above-mentioned reward system for decentralized computation.

In some embodiments, the THETA decentralized public ledger system may be built upon the following novel designs with Proof-of-Stake (PoS) mining. First, a multi-level Byzantine Fault Tolerant (BFT) consensus mechanism allows thousands of blockchain nodes to participate in a consensus process while still supporting very high transaction throughput, for example, in the range of 1,000+ transactions per second. To minimize transaction confirmation delays, the THETA protocol may use a small set of blockchain nodes to form a validator committee, producing a chain of blocks as fast as possible using a practical BFT (PBFT)-like process. With a sufficient number of validators such as 10 to 20 nodes, the validator committee may produce blocks at a fast speed, while still retaining a high degree of difficulty to prevent an adversary from compromising the integrity of the blockchain. A transaction is "committed" once it is included in a new block. To be eligible to join the validator committee, a node may lock up a certain amount of stake for a period of time. The locked stake could be slashed or removed if malicious behavior is detected. For example, slashed cryptocurrency tokens may be burned or redistributed to other validators proportionally. The blocks that the committee reaches consensus on are called settled blocks, and the process by which it produces a chain of blocks is called the block settlement process.

Next, consensus participants called guardian nodes may validate and finalize the chain generated by the validator committee at checkpoint blocks. The guardian network is a super set of the validator committee, where a validator is also a guardian. With a certain amount of token locked up for a period of time, any node in the network may become a guardian. The guardians may download and examine the chain of blocks generated by the validator committee and try to reach consensus on the checkpoints. "Finalization" refers to convincing each honest or non-malicious guardian that more than a certain portion (e.g., $2/3$) of all the other guardians see the same chain of blocks. Blocks that the guardian nodes have reached consensus on are called finalized blocks, and the process by which they finalize the chain of blocks is called the block finalization process. Checkpoint blocks are a selected subset of blocks that satisfy a given set of conditions, for example, whose height are a multiple of some integer. The block height of a particular block refers to the number of confirmed blocks preceding it in the blockchain, starting from the genesis block (i.e., block zero). This "leapfrogging" finalization strategy leverages the immutability characteristic of the blockchain data structure, where as long as at least two guardian nodes agree on the hash of a block, with overwhelming probability, they would have the same copy of the entire blockchain up to that block. The validator/guardian division provides multiple levels of security guarantee. The validator committee provides a first level of consensus and the guardian pool forms a second line of defense. With thousands of nodes, it is substantially more difficult to compromise the integrity of the network, and thus provides a higher level of security. This consensus mechanism achieves a good trade-offs among transaction throughput, consistency, and level of decentralization.

In some embodiments, the THETA blockchain network uses an aggregated signature gossip scheme to significantly reduce messaging complexity. Each guardian node keeps combining partially aggregated signatures from all its neighbors, and then gossips out the aggregated signature. This way the signature share of each node can reach other nodes at an exponential rate. In addition, signature aggregation keeps the size of the node-to-node messages relatively small, and thus further reduces communication overhead.

Furthermore, in some embodiments, edge nodes in the THETA network may be configured into "elite edge nodes" with stakes to avoid certain types of attacks such as Sybil attacks, and the aggregated signature gossip routine may be enhanced to prove the uptime of such elite edge nodes, with rewards to encourage edge node counts and to increase resource capacity in the network. In particular, elite edge nodes may be connected to validator and guardian nodes to form a joint mesh network. Elite edge nodes may broadcast their verification signatures such as Boneh-Lynn-Shacham (BLS) signatures of the latest checkpoint block to guardian nodes to aggregate. Such BLS signature shares of the active elite nodes may be aggregated by guardians into one signature, and written into the blockchain through new blocks proposed by validators. That is, the BLS signature share of an elite node may prove that the node was up and running when the corresponding block was produced. In some embodiments, for each checkpoint block, a subset of elite edge nodes may be sampled, deterministically or randomly, to receive an "uptime mining" reward. To avoid missing such rewards, an elite edge node needs to stay online, download the latest block header, check if it is in the sampled set, and sign the checkpoint block hash and gossip out the signature if selected. This incentive mechanism maximizes the uptime of edge nodes, and thus improves the availability of the THETA network.

In some embodiments, the THETA ledger system offers off-chain Resource-Orientated Micropayment Pools. A micropayment pool enables small one-to-one, one-to-many and many-to-one payments using off-chain transactions. For decentralized computing, a task initiator can pay for computation by multiple edge nodes, and an edge node can be paid for computation completed for multiple tasks and for multiple task initiators, all with only a limited number of on-chain transactions.

In some embodiments, the THETA ledger system provides native support of smart contracts which implement decentralized computer applications stored on a blockchain and can be called and executed when predetermined or preexisting terms and conditions are met, or when an agreement between participating parties are reached (e.g., as confirmed via electronic signatures). More specifically, a smart contract is a computer program written into a blockchain. Within the peer-to-peer blockchain network, each node may be viewed as part of an emulated global computer that runs the smart contracts. Once created and deployed, contract code cannot be modified, and the smart contract becomes immutable. Changes to a smart contract requires the deployment of new instances. A deployed smart contract may be invoked, called, or executed deterministically, for example upon the submission of a transaction directed to a contract address. That is, when a transaction destination is a contract address, the commitment of the transaction to the blockchain may cause the contract to be run with the transaction's data payload as input. For example, transaction data may indicate which specific function of the smart contract to call with which specific input parameter values. A smart contract may react to a transaction by further calling or invoking another smart contract, or functions within the other smart contract. In various embodiments, smart contracts may be written in high-level programming languages such as Solidity, Serpent, Vyper, Bamboo, and the like. Furthermore, as analogous to general computer programming constructs and applications, a "smart contract" in this disclosure may refer to a collection of multiple smart contracts, each of which may or may not interact with others through function calls. For example, in some embodiments, each member smart contract may correspond to a respective contract address, and the submission of a transaction to any member contract address may be viewed as an invocation of the overall smart contract.

In some embodiments, specialized incentive smart contracts may be used in the creation and management of micropayment pools or reward pools, especially when a large number of different parties are involved. Rather than requiring complex application logic, an incentive smart contract simplifies the process of collecting and distributing rewards based on certain pre-defined criteria and allocations across different parties, such as task initiators, edge workers, advertisers, content providers, viewers, elite edge nodes, and even miners in the blockchain network. In order for a recipient to receive a payment, a certain proof may be sent to the smart contract. Upon proof validation, the smart contract may initiate the reward, without involving original funders of the incentive smart contract.

In some embodiments, smart contracts may facilitate distributed computing and automatic reward processes. That is, the deployment of smart contracts on the THETA blockchain may allow computing tasks to be registered, "published", or "posted", verified, and further paid for when verified. A smart contract may be triggered to verify a solution when the solution is received from an edge computing node, or be triggered to transfer a token award from a reward pool to an edge computing node if a notification is received from a task initiator indicating that a solution generated by the edge computing node has been successfully verified. In the next sections, exemplary embodiments are discussed for both on-chain solution verification and off-chain solution verification, respectively, with reference to FIGS. 4-7B.

Solutions may be verified by various methods. For example, in some embodiments, the solution may be verified directly. Alternatively, in other embodiments, the solution may be verified indirectly, for example by verifying a sub-part of the solution. In yet other embodiments, the same problem may be sent to two or more edge computing nodes, and the solution may be verified by comparing the solution from each edge computing node. In the case of more than two edge computing nodes providing a solution, the solution from a majority of the edge computing nodes may be selected. Finally, in yet other embodiments, the solution may not be verified directly, but the solution can be estimated to be correct based on various factors, including a reputation score of an edge computing node. In short, a solution may be verified by checking that the solution meets one or more criteria.

As further shown in FIG. 3, in a more generalized framework, a crypto economic infrastructure layer 320 may support incentivization, reward pooling, and micropayment process implementations within the THETA decentralized data delivery and computing network. A set of Application Programming Interfaces (APIs)/libraries may be provided by THETA Labs for developers to build smart contracts and crypto wallets. For example, in addition to direct incentive mechanisms for peer-to-peer models where end users send rewards to caching or computing nodes in exchange for resource sharing, the THETA network may also allow incentive mechanisms where an edge node can function as a blockchain miner node to validate transactions and assemble blocks, with more mining rewards provided when more resource is shared and better services are provided. In short, smart contracts on the THETA network may enable reward models, transparent reward distributions, trustless crowdfunding mechanisms, and other social and crypto-economic interactivities, all in support of THETA network's core functionalities that include, but are not limited to, data delivery and distributed computing.

Lastly, an applications layer 330 in the THETA ecosystem 300 provides a platform for programming and integrating decentralized applications (DApps) by DApp partners and developers. A DApp may include one or more smart contracts on a blockchain, and a web frontend user interface (UI). The THETA network enables UIs and program codes implementing application-level logic consistent with user expectations of the DApps. In addition, a THETA JavaScript mesh networking library may be used to build the decentralized data delivery and computing network, and a THETA SDK may be used for integration of the applications with existing software and/or hardware.

Decentralized Edge Computing with On-Chain Solution Verification

In this section and the subsequent one, the design and system architecture of a blockchain and smart contract-powered decentralized edge computing platform are provided.

Figure 4:
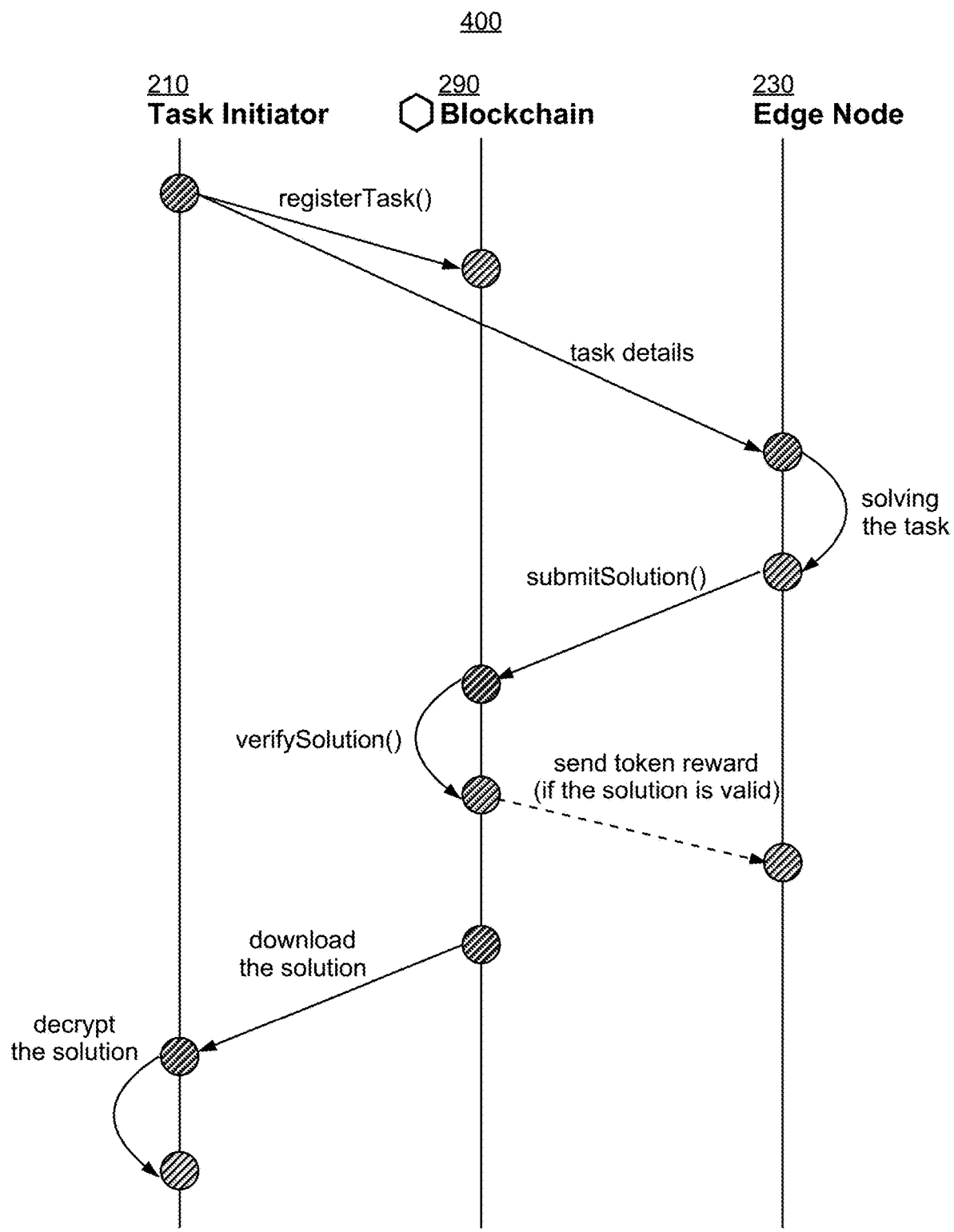
FIG. 4 shows an exemplary process diagram for distributed edge computing with on-chain solution verification and reward distribution via smart contracts on a blockchain, according to one embodiment of the present invention.

FIG. 4 shows an exemplary process diagram 400 for distributed edge computing with on-chain solution verification and reward distribution via smart contracts on a blockchain, according to one embodiment of the present invention. In this example, task initiator node 210 as shown in FIG. 2 assigns a computation task to edge computing node 230. Task solution verification and solver rewarding may be performed on-chain in a trustless fashion when a size of the solution as provided by edge computing node 230 is assumed to be small (e.g. a few kilobytes long).

As discussed previously, a task may refer to any computer-implemented processes that use multiple CPU cycles to execute a given set of computation instructions, to convert a set of input data into a set of output data, or to compute a solution to a proposed or registered problem. The solution may be subjected to one or more requirements on accuracy, precision, and the like. Exemplary tasks include, but are not limited to, any one or combination of data cleaning, search, comparison, sampling, interpolation, extrapolation, transformation, transcoding, equation solving, statistical analysis, numerical modeling, and machine model training and validation. The solution to different tasks may take on different formats and sizes depending on the nature of the tasks. Some tasks may be batched together, while some may be subdivided.

The following are two illustrative examples of task solution verification triples, where the solution size is small and on-chain verification may be implemented.

Example 1: Find the Largest Known Twin Primes

Task: Find a pair of twin primes that is larger than any pairs previously submitted to the smart contract. A twin prime pair is a pair of prime numbers that differs by two (e.g., 5 and 7, 59 and 61). The task initiator may submit the largest known twin primes to the smart contract when setting up a reward pool.
Solution: Two numbers.
On-chain verification: The smart contract may verify the two numbers submitted by an edge computing node are indeed prime numbers that differ by two and are larger than any pairs previously submitted to the contract. zk-SNARK technique as described later in this section may be employed to reduce the verification complexity, where the zk-SNARK proof may need to be submitted by the edge computing nodes along with the prime pairs.

Example 2: Integer Factorization

Task: The task initiator posts a big integer and asks for its factorization.
Solution: Prime integer numbers whose product equals to the big integer.
On-chain verification: The smart contract may verify that 1) the submitted integers are all prime numbers, and 2) the product of the submitted integers equals to the big integer. Again, zk-SNARK technique may be employed to reduce the verification complexity similar to Example 1 above.

In some embodiments, the task solution does not need to be kept secret. For such cases, unencrypted or plain-text solutions may be submitted to a blockchain smart contract directly for on-chain verification.

In some embodiments, task initiator 210 may be configured to not reveal solutions to the public. For such cases, edge node 230 may submit encrypted solutions to the blockchain. For a smart contract to verify the correctness of an encrypted solution without decrypting it, zero-knowledge proof techniques like non-interactive zero-knowledge proof may be used. In cryptography, a zero-knowledge proof technique or protocol is a method in which a first party known as the "prover" can prove to a second party known as a "verifier" that the prover possesses knowledge of certain information without revealing the information itself, or any other information apart from the fact that the prover knows the information. A non-interactive zero-knowledge proof is a zero-knowledge proof that requires no interactions between the prover and verifier. That is, after an initial setup phase, a single message may be sent from the prover to the verifier, without additional back-and-forth communication between the two parties. An exemplary non-interactive zero-knowledge proof is zk-SNARK, short for zero-knowledge Succinct Non-Interactive Arguments of Knowledge. "Succinct" refers to zero-knowledge proofs where the message is small in size when compared to the length of the information or solution being verified. With zk-SNARK, the correctness of computation may be verified without having to execute the computations or having to know what was executed. In the exemplary embodiment shown in FIG. 4, edge node 230 may generate a zk-SNARK proof for the solution it has computed for a task from task initiator 210, and submit the proof together with the encrypted solution to blockchain 290. More details on the design and use of zk-SNARKs are disclosed in zkSNARKs in a Nutshell by Christian Reitweibner (available at https://chriseth.github.io/notes/articles/zksnarks/zksnarks.pdf, and incorporated by reference in its entirety herein).

An added benefit of zk-SNARK is to reduce the computational cost of solution validation or verification, when the cost of on-chain solution verification using smart contracts is proportional to the number of computational steps of the verification process. The zk-SNARK technique can turn any computation in the class nondeterministic polynomial (NP) time complexity into a verification process with a constant number of steps, which can be conducted on-chain.

Table 1 as listed at the end of the present disclosure provides code snippets for an exemplary smart contract RewardPoolWithOnChainVerification written in the Solidity programming language for on-chain solution verification. In some embodiments, this smart contact may be initially deployed and/or later invoked by task initiator 210, and may have multiple functions or APIs including the following two functions:

registerTask( ): This function allows task initiator 210 to register a task on blockchain 290 by providing a function (e.g., hash function) of the task, and the address of another smart contract verifierContract, which may be responsible for verifying any solution submitted by one or more edge computing nodes for this particular task. The implementation of verifierContract may conform to the VerifierInterface interface in the exemplary code snippet shown in Table 1. In some embodiments, the verifierContract may be task-specific. That is, this verifier contract may be different for each different individual task, for different groups of individual tasks, or for different types of individual tasks. Before calling registerTask( ) to register a task, task initiator 210 may deploy the verifierContract contract for that task on the blockchain and obtain the contract's address. In addition, task initiator 210 may provide rewards for solving this task. In some embodiments, a reward pool may be established by task initiator 210 on the blockchain by submitting a funding transaction to the blockchain with a reward deposit. In the exemplary code snippet shown in Table 1, TFUEL is used as token rewards (via msg.value), but rewards may be made in any token or cryptocurrency as disclosed herein. After this function registerTask( ) is called, the smart contract records this task on the blockchain. As discussed previously, the chained RewardPoolWithOnChainVerification contract and the verifierContract contract may be viewed as a single smart contract or DApp on blockchain 290. When the verifierContract contract is task-specific, the RewardPoolWithOnChainVerification contract and multiple task-specific verifierContract contract instances may be viewed collectively as a single smart contract or DApp on the blockchain. Yet in some embodiments, functions within one or more verifierContract contracts may be implemented in the RewardPoolWithOnChainVerification contract directly.

submitSolution( ): This function allows an edge node 230 to submit a solution it has computed to the smart contract, and get rewarded if the solution is verified to be valid.

Non-Encrypted Solution Handling: In some embodiments, task initiator 210 may allow the solutions to be published on-chain, and edge node 230 may submit a plain-text solution as a byte string. As described by the exemplary Solidity code snippet shown in Table 1, the verifierContract smart contract may be called to validate the correctness of the solution, via a verifySolution( ) function. If the solution passes the checks, edge node 230 may be marked as the solver, and the reward (e.g., in the form of TFUEL or another token/cryptocurrency) may be sent to the solver automatically, for example from a reward pool as established by task initiator 210.

Encrypted Solution Handling: In some embodiments, the system may be configured to not reveal the solutions publicly, and edge node 230 may submit an encrypted solution as well as a zk-SNARK proof zkProof to blockchain 290. More specifically, task initiator 210 may publish its public key so that edge node 230 may encrypt the solution using this public key (e.g. via the ElGamal encryption protocol). The verifySolution( ) function of the verifierContract smart contract may verify the correctness of the zk-SNARK proof, which would prove that 1) the plain-text solution solves the task (e.g. satisfies a set of constraints), and 2) the solution submitted is indeed the encrypted plain-text solution using the public key of task initiator 210.

In the code example shown in Table 1, if multiple edge computing nodes solve the same task, only the first node that successfully submits the solution to the smart contract may obtain the reward. In some embodiments, a solution computed by this first node may be verified by the verifierContract contract before solutions computed by other nodes are verified. In some embodiments, multiple edge computing nodes may share the reward instead, with more than one solution verified by the verifierContract contract, and portions of an allocated reward transferred to individual nodes that have provided the solutions respectively. For example, reward splitting among multiple edge nodes may be implemented when the designated computation task involves certain randomness, and solutions provided by different edge computing nodes are all correct without being identical. In some embodiments, reward splitting among multiple edge computing nodes may be proportional to or scaled based on some characteristics, quality, or metadata of individual solutions submitted, such as a resolution, size, accuracy, sample variance, and the like.

FIG. 4 illustrates the interactions among three entities: task initiator 210, blockchain 290 which hosts the smart contracts, and edge computing node 230. Below is an interaction flow described at a high level. Although FIG. 4 only depicts one edge computing node 230, it may be extended to handle multiple edge computing nodes in a similar fashion.

Step 1: Task initiator 210 creates a task and registers the task on blockchain 290 by calling a function RewardPoolWithOnChainVerification.registerTask( ). Meanwhile, Task Initiator 210 may assign the task to edge computing node 230 by sending task details or task information to edge computing node 230, possibly through a secure channel. Task information refers to any one or combinations of task definition, description, metadata, input data, computing instructions, or the like, that allows edge computing node 230 to generate an acceptable solution to the task. In some embodiments, edge nodes may poll the RewardPoolWithOnChainVerification contract on regular intervals to see if another task is available. If there are additional tasks, an edge computing node may ping task initiator 210 to download task details. In different embodiments, task initiator 210 and edge computing node 230 may be viewed as having a server-client relationship, implemented through appropriate networking protocols. In some embodiments, they are implemented as peer nodes connected by a peer-to-peer connection.

Step 2: Edge computing node 230 solves the task, and calls the submitSolution( ) function on the RewardPoolWithOnChainVerification contract to submit the solution to the smart contract. If task initiator 210 requires solution encryption, edge computing node 230 may also provide a zk-SNARK proof zkProof.

Step 3: The RewardPoolWithOnChainVerification.submitSolution( ) function may call the verifierContract smart contract to verify the solution (and the zk-SNARK proof zkProof if applicable). Upon successful verification, a reward may be transferred to edge computing node 230 by the RewardPoolWithOnChainVerification contract.

Step 4: Task initiator 210 may download the verified encrypted solution from blockchain 290, and optionally use its private key to decrypt the solution.

Figure 5A:
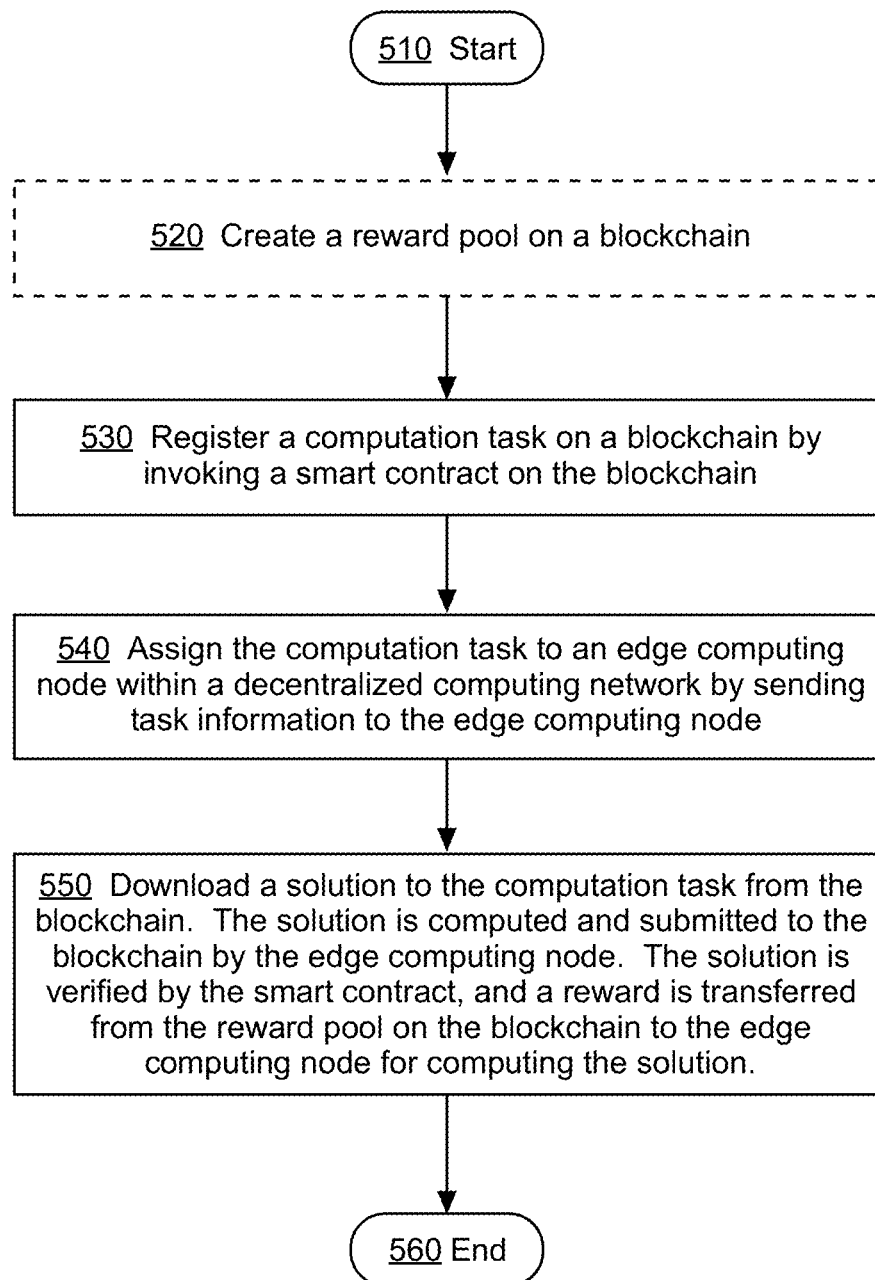
FIG. 5A is an illustrative flow diagram for a process performed by a task initiator node in association with decentralized edge computing with on-chain solution verification, according to one embodiment of the present invention.

FIG. 5A is an illustrative flow diagram 500 for an exemplary process performed by a task initiator node in association with decentralized edge computing with on-chain solution verification, according to one embodiment of the present invention. Upon initiation at a step 510, a reward pool may be created by the task initiator on a THETA blockchain in an optional step 520, if such a reward pool has not already been established. The creation of the reward pool may be carried out by submitting, to the blockchain, a funding transaction record that encodes a reward deposit amount. This reward pool may be created by the task initiator node, or may be created by yet another party, such as an upstream task initiator, or a third party task server. At a step 530, a computation task may be created or registered on the blockchain, by invoking a smart contract on the blockchain. This smart contract may have been deployed previously by the task initiator itself, or another entity such as the upstream task initiator, or the third party task server. At a step 540, the computation task may be assigned to an edge computing node, by sending task information to the edge node, for example through a secure connection. A secure connection here refers to a network connection that has additional security measures in place to help protect it from outside attackers. For example, the task information may be encrypted with a shared key. In some embodiments, an authentication handshake may be required between the edge computing node and the task initiator node. At a step 550, a verified solution to the computation task may be downloaded to the task initiator from the blockchain. The solution is computed by the edge computing node. The solution is submitted to the smart contract and verified by the smart contract, and a reward is transferred from the reward pool on the blockchain to the edge computing node for computing the solution. The process terminates at step 560. In some embodiments, solution download and reward transfer may be concurrent. In other words, a reward transfer transaction may be submitted but not yet validated as the solution is being downloaded.

Figure 5B:
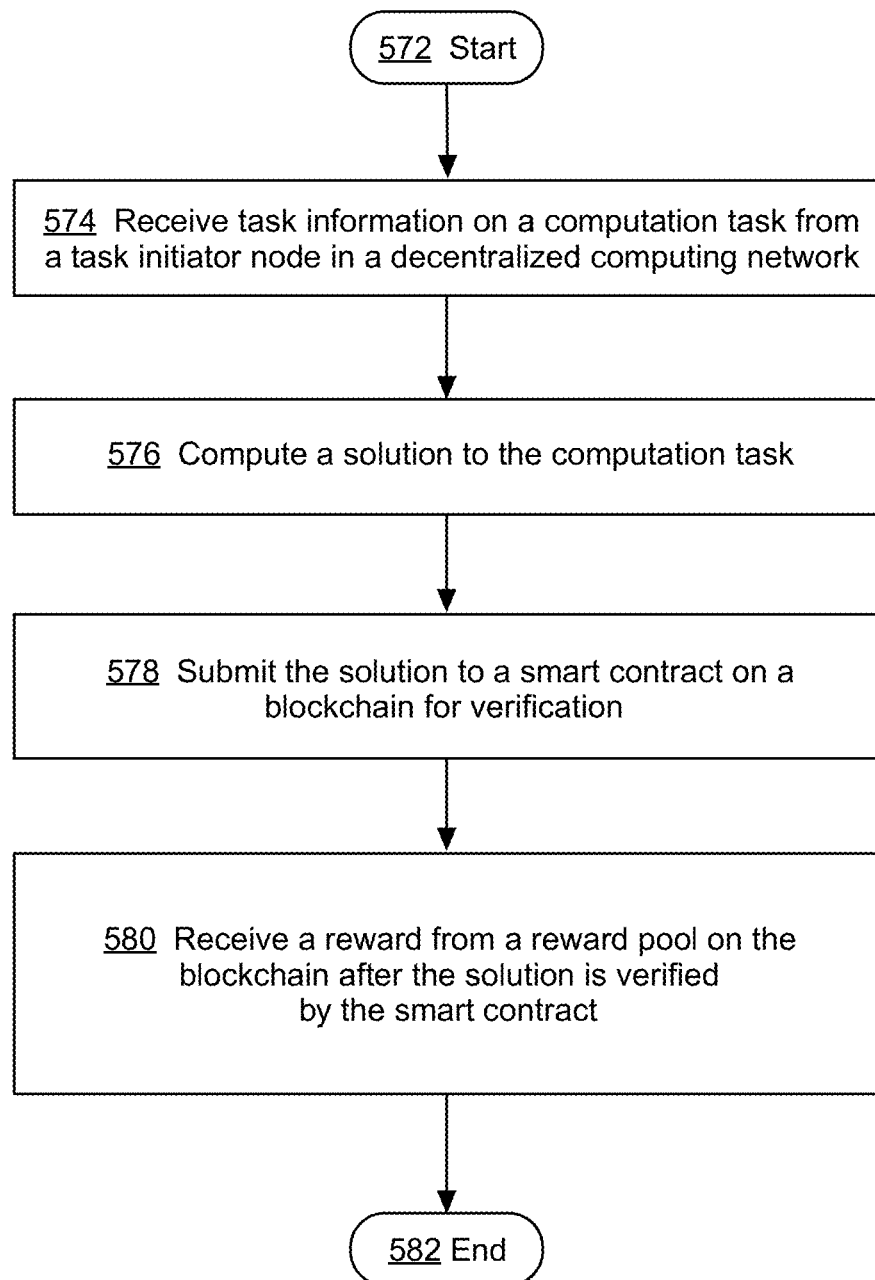
FIG. 5B is an illustrative flow diagram for a process performed by an edge computing node in association with decentralized edge computing with on-chain solution verification, according to one embodiment of the present invention.

FIG. 5B is an illustrative flow diagram 570 for a process performed by an edge computing node in association with decentralized edge computing with on-chain solution verification, according to one embodiment of the present invention. The process starts at step 572. The edge computing node receives task information on a computation task from a task initiator node in the decentralized computing network at step 574. The computation task is registered on a blockchain by the task initiator node by invoking a smart contract on the blockchain. Next, the edge computing node computes a solution to the computation task at step 576. Then, the edge computing node submits the solution to the smart contract for verification at step 578. Finally, the edge computing node receives a reward from a reward pool on the blockchain after the solution is verified by the smart contract at step 580. The process ends at step 582.

Decentralized Edge Computing with Off-Chain Solution Verification

Figure 6:
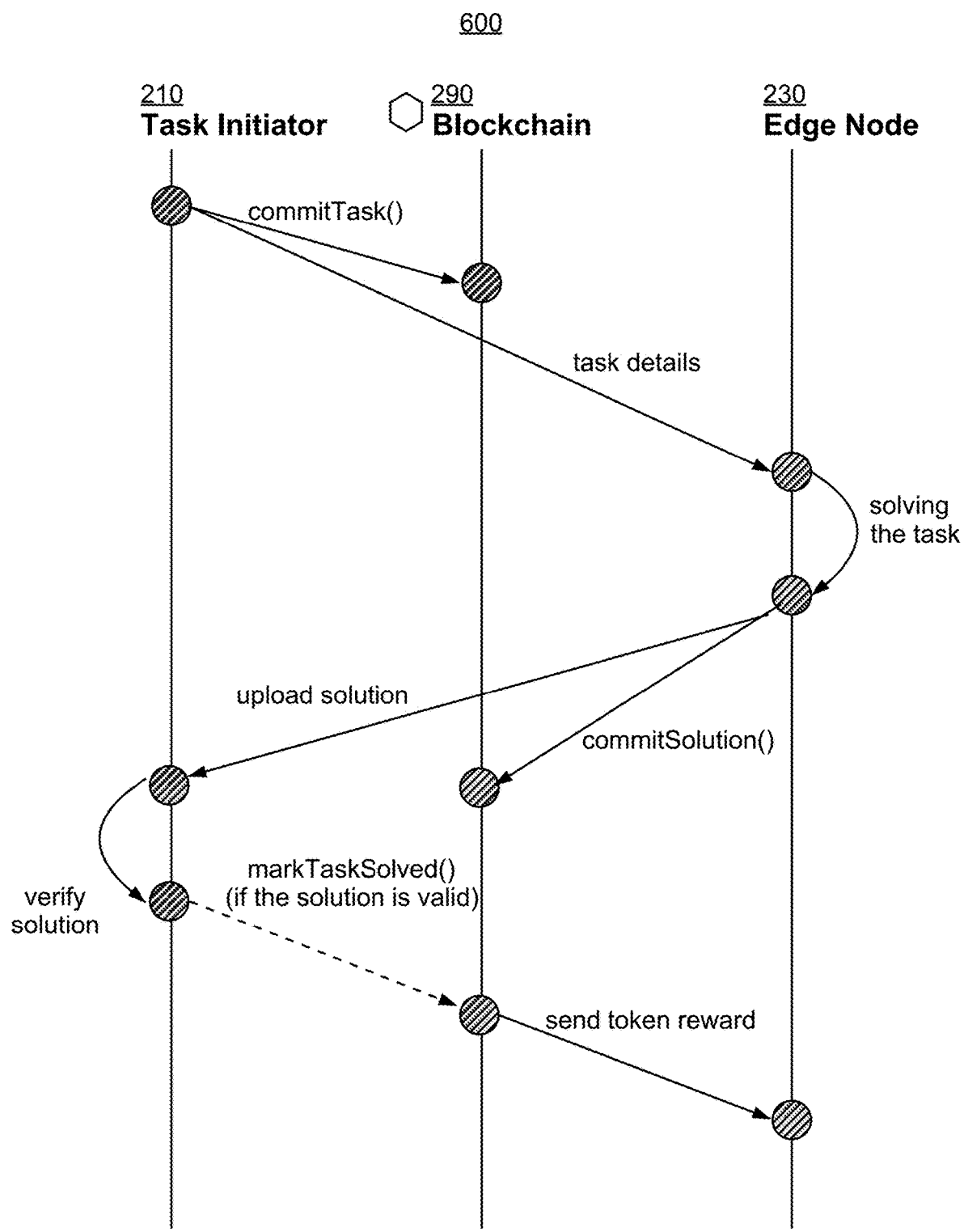
FIG. 6 shows an exemplary process diagram for distributed edge computing with off-chain solution verification and reward distribution via smart contracts on a blockchain, according to one embodiment of the present invention.

FIG. 6 shows an exemplary process diagram 600 for distributed edge computing with off-chain solution verification and reward distribution via smart contracts on a blockchain, according to one embodiment of the present invention. In this exemplary process, the solution size may be large (e.g. a few megabytes or larger) and publishing the entire solution on-chain might not be feasible. For such cases, task initiator 210 may verify the solutions off-chain and call smart contracts to reward one or more edge computing nodes which have completed the task. Table 2 lists code snippets of an exemplary smart contract which handles the reward distribution with off-chain solution verification.

The following are two illustrative examples of task solution verification triples where the solution size is large and off-chain verification may be implemented.

Example 1: Video Transcoding

Task: A video platform may post a transcoding task to transcode a raw video file into videos with multiple resolutions.
Solution: Transcoded videos with the requested resolutions.
Verification: The video platform may verify the correctness of the transcoded videos by sampling frames, etc.

Example 2: Protein Folding (e.g., Folding@Home)

Task: Protein folding problems. Proteins are large complex biomolecules made up of hundreds and thousands of smaller amino acid units connected into long linear chains. Proteins are critical to many biological functions, biochemical reactions, and cell processes. To become biologically functional, proteins must take on particular three-dimensional shapes or structures, also known as "folds." Protein folding is statistical in nature, where a protein can fold in many ways. The conformation (e.g., shape) or configuration space of proteins are vastly complex, and many factors may contribute to the misfolding and misshaping of protein structures. Some diseases such as Alzheimer's and cystic fibrosis are believed to result from protein misfolding and aggregation. To understand the dynamics of the protein folding process on an atomic scale and to reveal new therapeutic opportunities, computer simulations may be implemented to model and study how atoms in a protein move relative to one another and how their energy properties change as the protein folds from one shape to another, using techniques such as Adaptive Sampling, Markov State Models, and Machine Learning. More details on the scientific background of the protein folding and modeling process are disclosed in Folding@home's homepage (available at https://foldingathome.org/dig-deeper/, and incorporated by reference in its entirety herein).
Solution: Protein folding results.
Verification: A Folding@home server may verify whether the protein folding results are valid.

Compared to the on-chain verification case, after obtaining the solution to a task, edge computing node 230 may commit a function of the solution (e.g., a hash function) to blockchain 290 by calling a commitSolution( ) function in the RewardPoolWithOffChainVerification contract, instead of uploading or sending the entire solution to blockchain 290. Furthermore, edge node 230 may send the complete solution to task initiator 210 through a separate, secure channel. Task initiator 210 may then verify the solution and mark the task as solved.

Compared to trustless on-chain verification, the off-chain solution verification flow may require a certain level of trust between edge nodes and the task initiators. In particular, task initiator 230 may call a RewardPoolWithOffChainVerification. markTaskSolved( ) function to transfer the reward to edge computing node 230 that correctly solved the assigned task. An adversarial task initiator could cheat on edge computing nodes by skipping this step. If this happens, a reputation of the task initiator may be tarnished quickly, and soon no edge computing node will solve tasks from this task initiator. In some embodiments, reputation ranking of different task initiator nodes in the network may be taken into consideration when an edge computing node chooses tasks from the blockchain to solve. Similarly, an edge computing node may have an associated reputation score based on past solution verification results and the number of tasks it has solved successfully. A more advanced task initiator may attempt to change its on-chain identity by posting new RewardPoolWithOffChainVerification contracts from a different address. To guard against this type of attacks, in some embodiments, task initiators may be required to deposit a certain number of non-redeemable collaterals (e.g., TFUEL tokens) to the RewardPoolWithOffChainVerification smart contract to begin with (e.g., see the constructor( ) function in Table 2). Thus, even though an adversarial task initiator can switch its on-chain identity by generating new reward pools, each pool-creation comes with non-negligible cost, which can effectively disincentivize malicious behaviors.

Figure 7A:
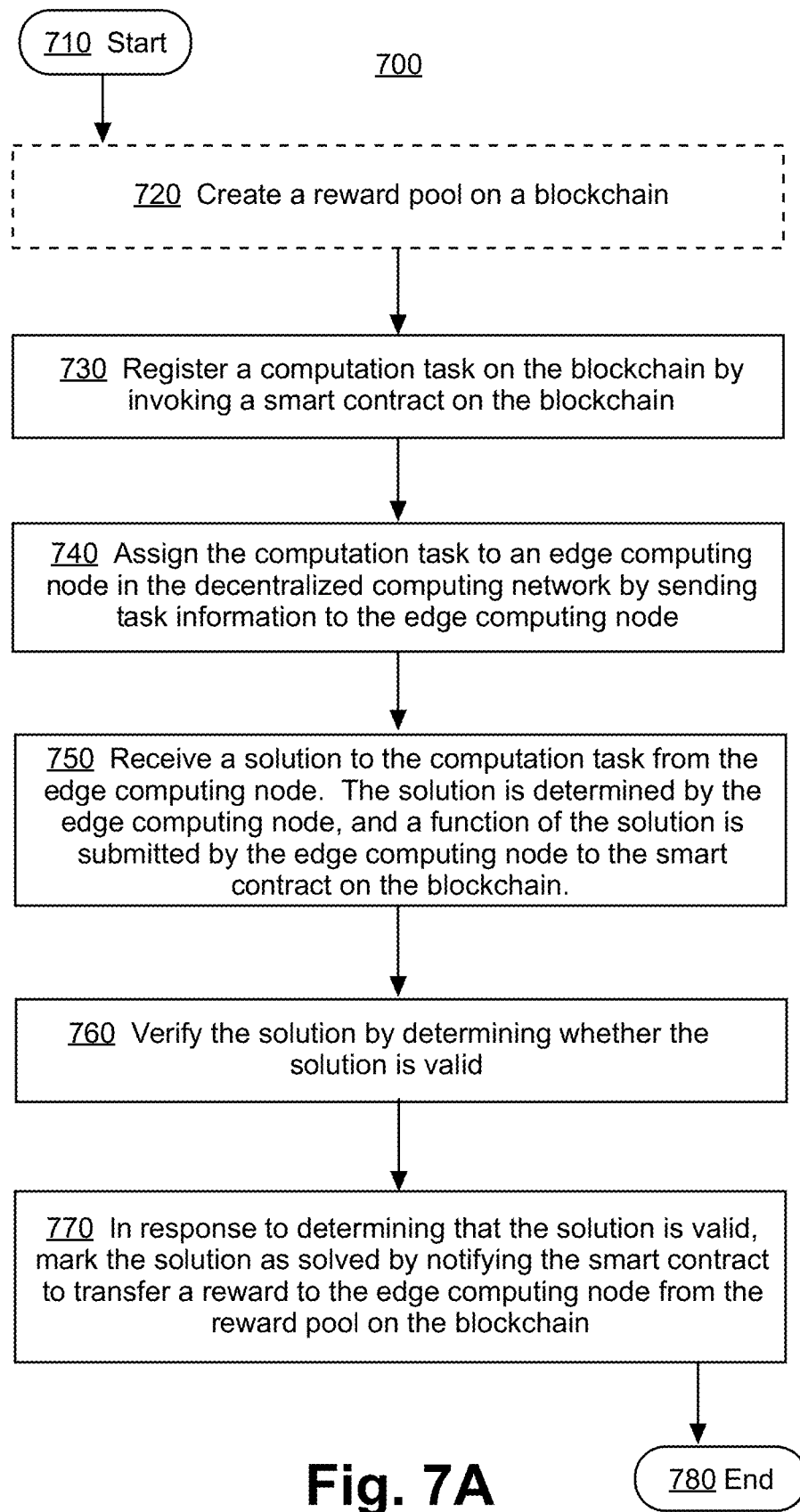
FIG. 7A is an illustrative flow diagram for a process performed by a task initiator node in association with decentralized edge computing with off-chain solution verification, according to one embodiment of the present invention.

FIG. 7A is an illustrative flow diagram 700 for an exemplary process performed by a task initiator node in association with decentralized edge computing with off-chain solution verification, according to one embodiment of the present invention. Upon initiation at a step 710, a reward pool may first be created on the blockchain in an optional step 720, if not already done. In some embodiments, the reward pool may be established by a separate third party. At a step 730, a computation task is created and registered on the blockchain by invoking a smart contract on the blockchain. The smart contract may have been deployed previously on the blockchain by the task initiator or a separate third party. At step 740, the computation task is assigned to an edge computing node by sending task information to the edge computing node, possibly through a secure connection. At a step 750, a solution to the computation task is downloaded from the edge computing node. The solution is computed or determined by the edge computing node, and a function of the solution is submitted to the smart contract on the blockchain. At step 760, the solution is verified by determining whether the solution is valid. At step 770, in response to determining that the solution is valid, the solution is marked as solved by notifying the smart contract to transfer a reward to the edge computing node from the reward pool on the blockchain. The process terminates at step 780.

Figure 7B:
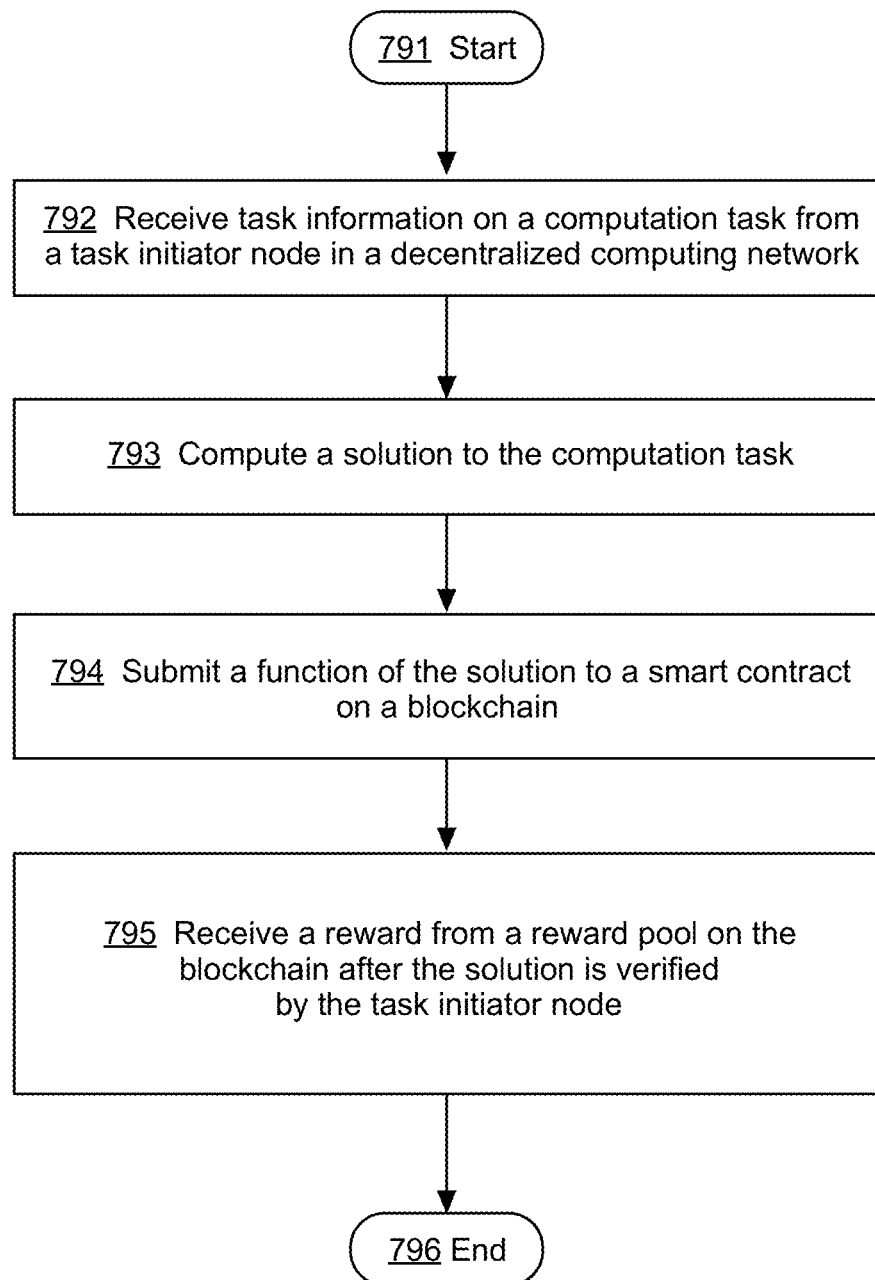
FIG. 7B is an illustrative flow diagram for a process performed by an edge computing node in association with decentralized edge computing with off-chain solution verification, according to one embodiment of the present invention.

FIG. 7B is an illustrative flow diagram 790 for a process performed by an edge computing node in association with decentralized edge computing with off-chain solution verification, according to one embodiment of the present invention. The process starts at step 791. The edge computing node receives task information on a computation task from a task initiator node in the decentralized computing network at step 792. The computation task has been registered on a blockchain by the task initiator node by invoking a smart contract on the blockchain. Next, the edge computing node computes a solution to the computation task at step 793. Then, the edge computing node submits a function of the solution to the smart contract at step 794. Finally, the edge computing node receives a reward from a reward pool on the blockchain after the solution is verified by the task initiator node at step 795. The process ends at step 796.

Exemplary Task Initiator and Edge Computing Node System Architectures

Figure 8A:
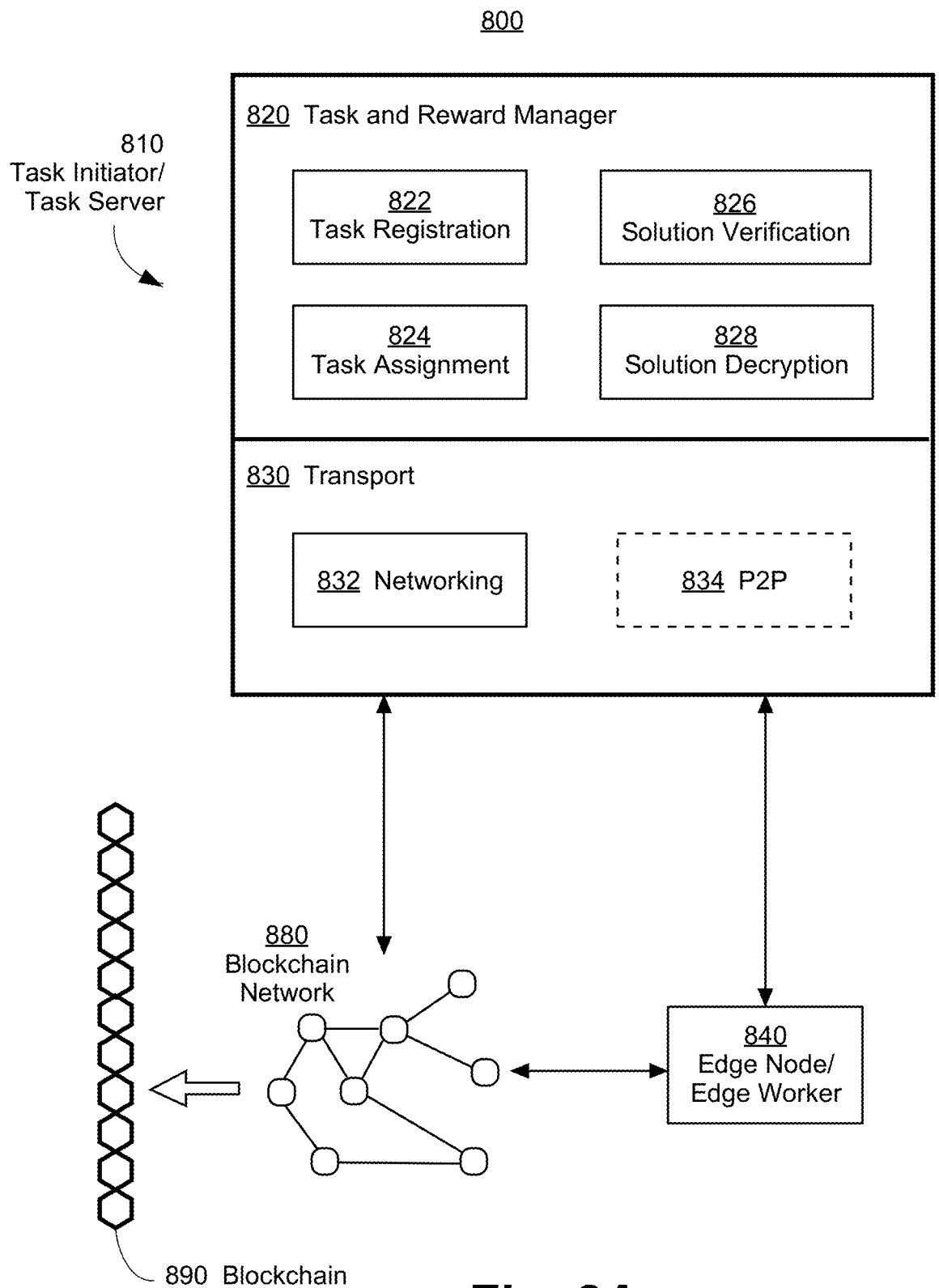
FIG. 8A is an exemplary architecture diagram of a task initiator node, according to one embodiment of the present invention.

FIG. 8A is an exemplary architecture diagram 800 of a task initiator node 810, according to one embodiment of the present invention. In this embodiment, task initiator 810 assigns, to an edge worker 840, a computation task that has been registered with a blockchain 890 as mined by a blockchain network 880. In this exemplary embodiment, task initiator 810 comprises two architectural layers, a task and reward manager 820, and a transport layer 830. Task and reward manager 820 comprises one or more components or submodules: module 822 for initiating task registration on blockchain 890, module 824 for task assignment to edge computing node 840, module 826 for off-chain solution verification when needed, and module 828 for decryption a solution encrypted by edge computing node 840. Transport layer 830 comprises one or more components for establishing and maintaining network connections with edge worker 840 and blockchain 890. For example, a P2P component 834 may be implemented in addition to a networking module 832 to facilitate P2P functions such as peer discovery.

Figure 8B:
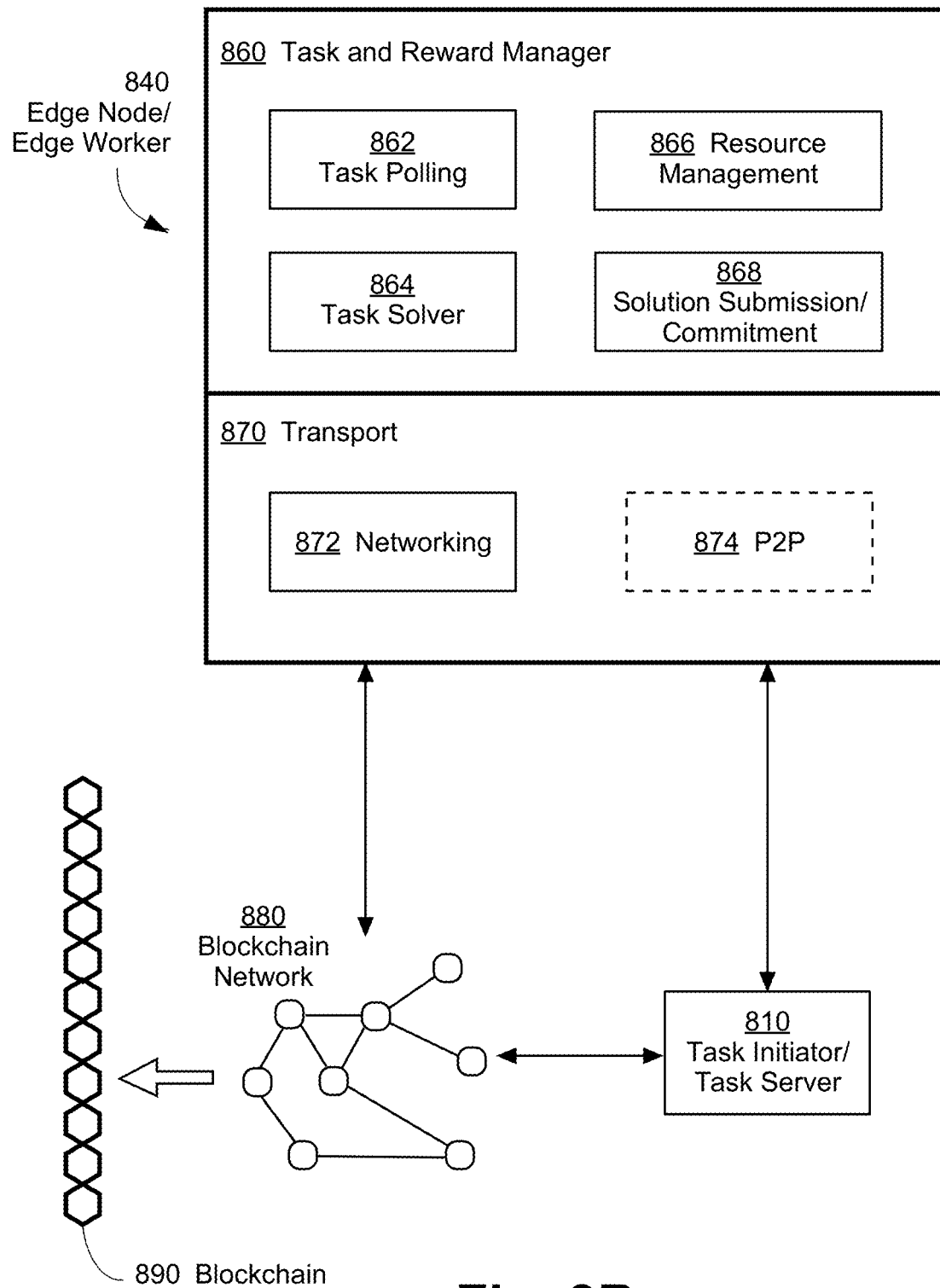
FIG. 8B is an exemplary architecture diagram of an edge node, according to one embodiment of the present invention.

FIG. 8B is an exemplary architecture diagram 850 of an edge computing node or edge worker node 840, according to one embodiment of the present invention. In this embodiment, edge worker node 840 receives, from task initiator 810, a computation task that has been registered with blockchain 890 as mined by blockchain network 880. In this exemplary embodiment, edge worker 840 comprises two architectural layers, a task and reward manager 860, and a transport layer 870. Task and reward manager 860 may comprise one or more components or submodules: module 862 for polling tasks from task initiator 810, module 864 for solving a task or executing a given set of computation instructions, module 866 for local computing resource management, and module 868 for solution submission/commitment to blockchain 890 or task initiator 810. Transport layer 870 may comprise one or more components for establishing and maintaining network connections with task initiator 810 and blockchain 890. For example, a P2P component 874 may be implemented in addition to a network module 872 to facilitate P2P functions such as peer discovery.

Figure 9:
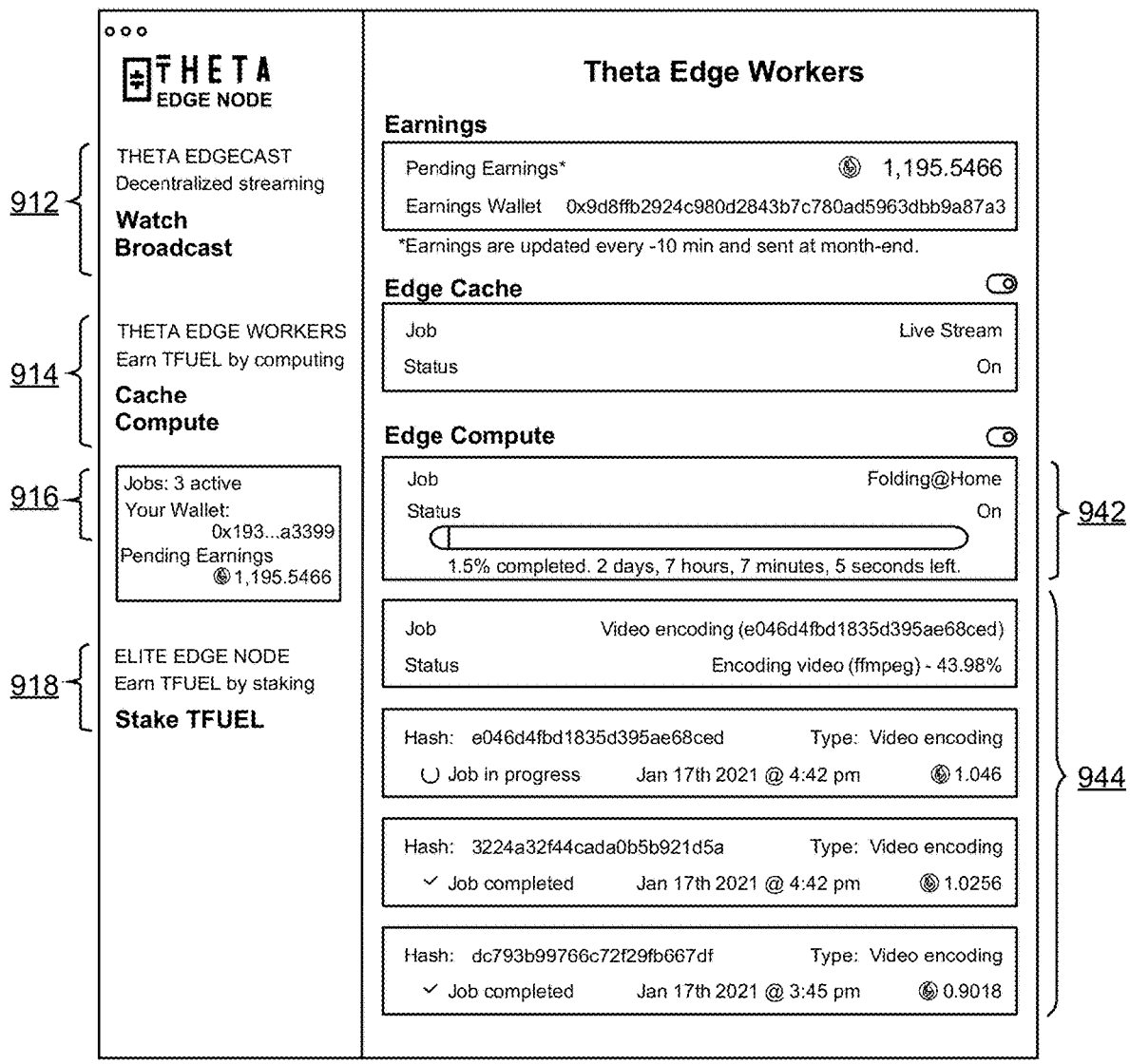
FIG. 9 is a diagram showing an illustrative graphical user interface for edgecast and edge computing on an edge node, according to one embodiment of the present invention.

FIG. 9 is a diagram 900 showing an illustrative graphical user interface (GUI) for edgecast and edge computing on an edge worker node, according to one embodiment of the present invention. Edgecast refers to data and/or bandwidth resource sharing over the THETA edge network. In this exemplary GUI, a left panel 910 provides sub-menus: menu 912 for selecting THETA edgecast data sharing, menu 914 for THETA edge computing, menu 916 for viewing job summaries and rewards, and menu 918 for additional staking and/or uptime mining. A right panel 940 lists individual earning amounts and caching or computing jobs currently in session or completed in the past.

In this particular example, two types of computing jobs are listed: Folding@home 942, and video transcoding 944.

Folding@home is a distributed computing project originally launched in 2000 to work on simulating protein dynamics, a modeling activity involved in the study of a variety of diseases, including Alzheimer's, Huntington's, cancer and others. Folding@home uses techniques such as Adaptive Sampling, Markov State Models (MSMs), and machine learning to study the protein folding process, to determine diseases that result from protein misfolding and aggregation, and to find novel computational ways to develop new drugs. MSMs describe conformations (e.g., shapes) of a protein as discrete states and parameterizes transitions among these states. MSMs can facilitate parallelization across computer processors by allowing statistical aggregation of short, independent simulation trajectories that can replace single long trajectories. Together with adaptive sampling, MSMs enable efficient distributed computations over vast number of individual computers.

In 2020, with the Coronavirus wreaking havoc around the world, Folding@home began focusing its compute power on SARS-CoV-2, the virus that causes COVID-19, first finding novel protein structures that were not easily accessible to the research community, then screening for potential drugs to target these structures. The goal is to identify new COVID-19 drugs, therapies and their possible side-effects. Folding@home is one of the world's largest, distributed supercomputing systems achieving over 2.43 exaflops in April 2020, powered by over four million volunteer computing devices running AMD, Intel CPUs, NVIDIA GPUs, and other processors.

The THETA edge computing network provides a "worker farm" for Folding@home. As shown in FIG. 9, by switching to the "Edge Compute" function, an edge node may automatically download Folding@home jobs to solve on the host computer. For example, edge nodes may perform, on their CPU and GPU resources, protein folding simulations that help determine which drug designs could be effective COVID-19 antivirals. Once a solution is computed, it may be submitted to the Folding@home backend for validation. The THETA edge compute network is scalable to millions of concurrent users with large resource availabilities. As THETA edge computing node devices may earn rewards such as TFUEL tokens on the THETA blockchain for their contributions, they can be expected to be significant and reliable contributors to Folding@home's projects.

In another example, video transcoding is the process of converting video files from one encoding format to another, to change file formats or to a different bitrate, for example. This is a critical function utilized by all video platforms, including NETFLIX, AMAZON PRMME, DISNEY+ and others to ensure video can reach the greatest number of users with different video players, Internet speeds, latency, and other factors that call for different video formats. According to the global consulting firm Markets and Markets, today's centralized video transcoding industry generates $1.1B in annual revenue, and is expected to grow by 15% per year into 2022 and beyond. It's a massive market and only growing bigger with more media and entertainment content moving to video.

As more video-on-demand, live streamed, online video shopping, and social user-generated videos are generated, transcoding is necessary to make them readily consumable by viewers around the world. This work can be reliably, efficiently, and seamlessly done through the THETA distributed edge computing network, with users earning rewards such as TFUEL tokens in exchange for completing such computation-intensive jobs. In one example, video uploads may be made from THETA.TV, a media platform powered by the THETA edge network, and/or other external customers or clients. The THETA edge network may provide an in-demand workflow and a turnkey solution that is attractive to all video platforms to use. A reward pool may be allocated as baseline rewards to edge nodes for transcoding services. In some embodiments, new video platforms that join the network may establish their own individual reward pools respectively. In some embodiments, a marketplace for distributed computing services may be established, where providers may price discrete jobs and edge nodes may bid for jobs to optimize profits, earnings, and/or efficiency.

Although not shown explicitly, a similar GUI may be implemented for a task initiator, with various panels for functions such as deploying and/or invoking smart contracts, setting up tasks and reward pools, and specifying solution verification conditions, etc.

Implementation Using Computer Program Products, Methods, and Computing Entities

Exemplary System Architecture

Figure 10:
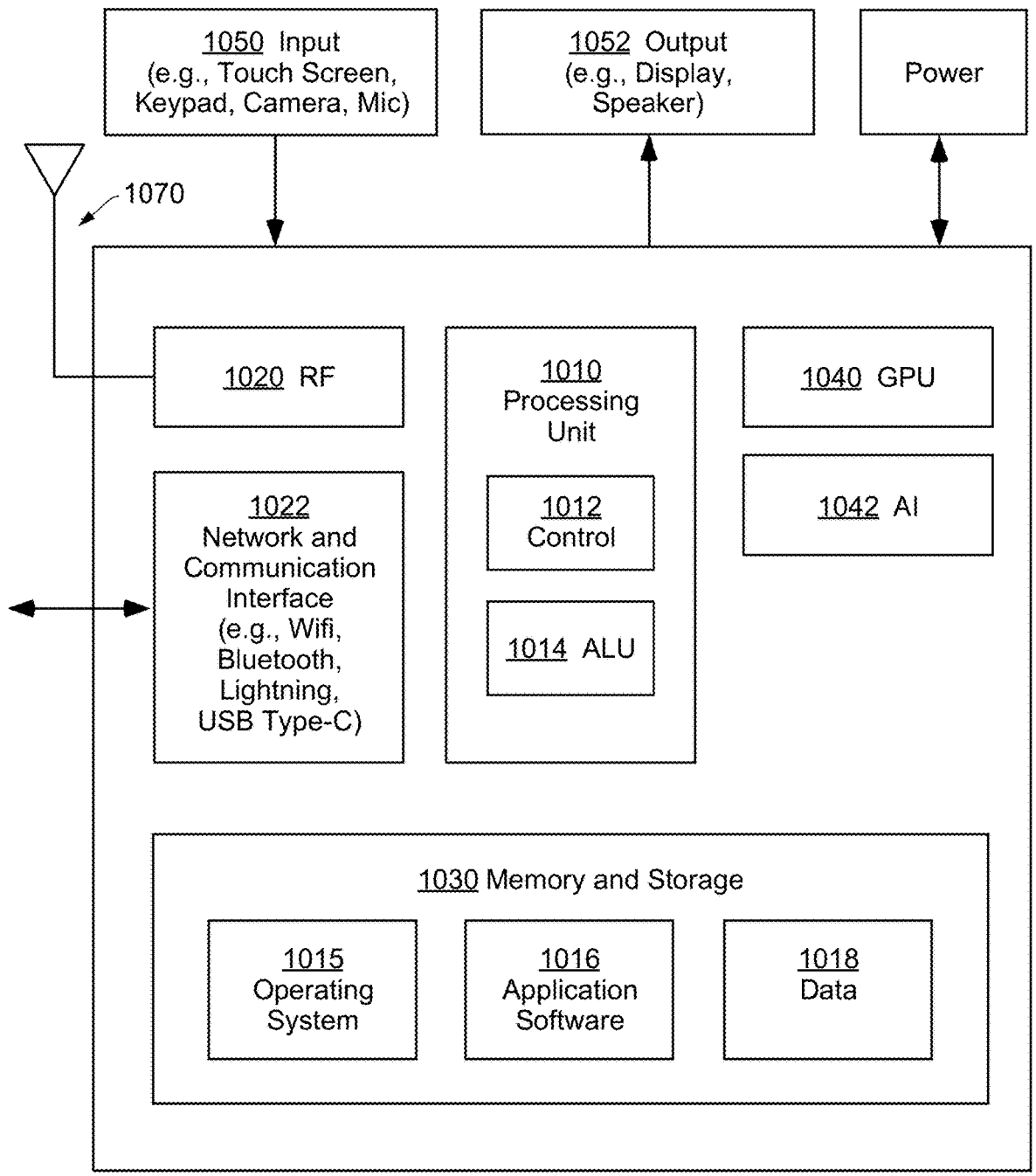
FIG. 10 is an exemplary schematic diagram of a user computing entity for implementing a peer node, such as an edge computing node, according to exemplary embodiments of the present invention.
Figure 11:
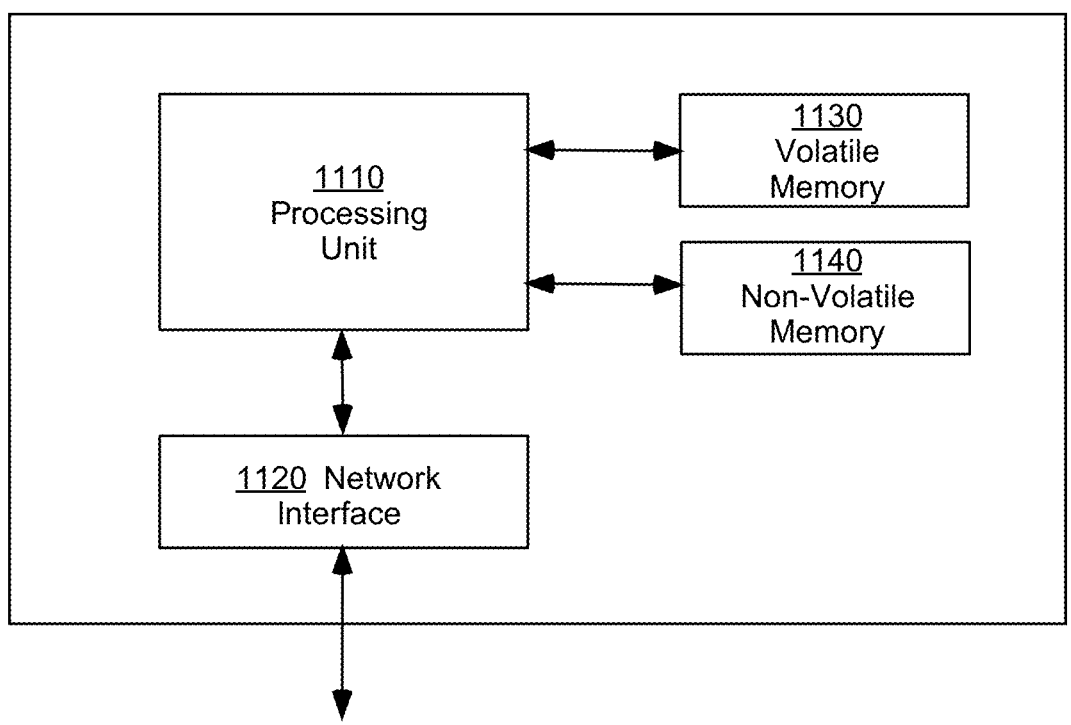
FIG. 11 is an exemplary schematic diagram of a management computing entity for implementing a server node, such as a task initiator node, according to exemplary embodiments of the present invention.

An exemplary embodiment of the present disclosure may include one or more end user computing entities 1000, blockchain nodes, or other management computing entities 1100, as shown in FIGS. 10 and 11. Each of these components, entities, devices, systems, and similar words used herein interchangeably may be in direct or indirect communication with, for example, one another over the same or different wired or wireless networks. Additionally, while FIGS. 10 and 11 illustrate the various system entities as separate, standalone entities, the various embodiments are not limited to this particular architecture. Both user computing entity 1000 and management computing entity 1100 may be implemented using similar, or even identical, hardware elements.

Exemplary User Computing Entity

FIG. 10 is an exemplary schematic diagram of a user computing entity for implementing a peer node such as an edge computing node or a task initiator node, according to exemplary embodiments of the present invention. An end user computing device 1000 capable of performing a computational task includes one or more components as shown. As will be recognized, these architectures and descriptions are provided for exemplary purposes only and are not limiting to the various embodiments.

In general, the terms device, system, computing entity, entity, and/or similar words used herein interchangeably may refer to, for example, one or more computers, computing entities, desktops, mobile phones, tablets, phablets, notebooks, laptops, distributed systems, gaming consoles (e.g., Xbox, Play Station, Wii), watches, glasses, key fobs, Internet of Things (IoT) devices, radio frequency identification (RFID) tags, ear pieces, scanners, cameras, wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, retrieving, operating on, processing, displaying, storing, determining, creating, generating, monitoring, evaluating, comparing, and/or similar terms used herein interchangeably. In various embodiments, these functions, operations, and/or processes can be performed on data, content, information, and/or similar terms used herein interchangeably. On the other hand, a task initiator/server, a tracker server, or payment server may be implemented according to the exemplary schematic diagram shown in FIG. 11, possibly in the cloud, and possibly with logically or physically distributed architectures.

As shown in FIG. 10, user computing entity 1000 may include an antenna 1070, a radio transceiver 1020, and a processing unit 1010 that provides signals to and receives signals from the transceiver. The signals provided to and received from the transceiver may include signaling information in accordance with air interface standards of applicable wireless systems. In this regard, user computing entity 1000 may be capable of operating with one or more air interface standards, communication protocols, modulation types, and access types. More particularly, user computing entity 1000 may operate in accordance with any of a number of wireless communication standards and protocols. In some embodiments, user computing entity 1000 may operate in accordance with multiple wireless communication standards and protocols, such as 5G, UMTS, FDM, OFDM, TDM, TDMA, E-TDMA, GPRS, extended GPRS, CDMA, CDMA2000, 1×RTT, WCDMA, TD-SCDMA, GSM, LTE, LTE advanced, EDGE, E-UTRAN, EVDO, HSPA, HSDPA, MDM, DMT, Wi-Fi, Wi-Fi Direct, WiMAX, UWB, IR, NFC, ZigBee, Wibree, Bluetooth, and/or the like. Similarly, user computing entity 1000 may operate in accordance with multiple wired communication standards and protocols, via a network and communication interface 1022.

Via these communication standards and protocols, user computing entity 1000 can communicate with various other computing entities using concepts such as Unstructured Supplementary Service Data (USSD), Short Message Service (SMS), Multimedia Messaging Service (MMS), Dual- Tone Multi-Frequency Signaling (DTMF), and/or Subscriber Identity Module Dialer (SIM dialer). User computing entity 1000 can also download changes, add-ons, and updates, for instance, to its firmware, software (e.g., including executable instructions, applications, program modules), and operating system.

In some implementations, processing unit 1010 may be embodied in several different ways. For example, processing unit 1010 may be embodied as one or more complex programmable logic devices (CPLDs), microprocessors, multi-core processors, coprocessor entities, application-specific instruction-set processors (ASIPs), microcontrollers, and/or controllers. Further, the processing unit may be embodied as one or more other processing devices or circuitry. The term circuitry may refer to an entirely hardware embodiment or a combination of hardware and computer program products. Thus, processing unit 1010 may be embodied as integrated circuits, application specific integrated circuits (ASICs), field programmable gate arrays (FPGAs), programmable logic arrays (PLAs), hardware accelerators, other circuitry, and/or the like. As will therefore be understood, processing unit 1010 may be configured for a particular use or configured to execute instructions stored in volatile or non-volatile media or otherwise accessible to the processing unit. As such, whether configured by hardware or computer program products, or by a combination thereof, processing unit 1010 may be capable of performing steps or operations according to embodiments of the present invention when configured accordingly.

In some embodiments, processing unit 1010 may comprise a control unit 1012 and a dedicated arithmetic logic unit 1014 (ALU) to perform arithmetic and logic operations. In some embodiments, user computing entity 1000 may comprise a graphics processing unit 1040 (GPU) for specialized image and video rendering tasks, and/or an artificial intelligence (AI) accelerator 1042, specialized for applications including artificial neural networks, machine vision, and machine learning. In some embodiments, processing unit 1010 may be coupled with GPU 1040 and/or AI accelerator 1042 to distribute and coordinate processing tasks.

In some embodiments, user computing entity 1000 may include a user interface, comprising an input interface 1050 and an output interface 1052, each coupled to processing unit 1010. User input interface 1050 may comprise any of a number of devices or interfaces allowing the user computing entity 1000 to receive data, such as a keypad (hard or soft), a touch display, a mic for voice/speech, and a camera for motion or posture interfaces. User output interface 1052 may comprise any of a number of devices or interfaces allowing user computing entity 1000 to provide content and information to a user, such as through a touch display, or a speaker for audio outputs. In some embodiments, output interface 1052 may connect user computing entity 1000 to an external loudspeaker or projector, for audio or visual output.

User computing entity 1000 may also include volatile and/or non-volatile storage or memory 1030, which can be embedded and/or may be removable. A non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory may store an operating system 1015, application software 1016, data 1018, databases, database instances, database management systems, programs, program modules, SDKs, scripts, source code, object code, byte code, compiled code, interpreted code, machine code, executable instructions, and/or the like to implement the functions of user computing entity 1000. As indicated, this may include a user application that is resident on the entity or accessible through a browser or other user interface for communicating with a management computing entity and/or various other computing entities.

In some embodiments, user computing entity 1000 may include location determining aspects, devices, modules, functionalities, and/or similar words used herein interchangeably. For example, user computing entity 1000 may include outdoor positioning aspects, such as a location module adapted to acquire, for example, latitude, longitude, altitude, geocode, course, direction, heading, speed, universal time (UTC), date, and/or various other information/data. In one embodiment, the location module may acquire data, sometimes known as ephemeris data, by identifying the number of satellites in view and the relative positions of those satellites. Alternatively, the location information may be determined by triangulating the user computing entity's position in connection with a variety of other systems, including cellular towers, Wi-Fi access points, and/or the like. Similarly, user computing entity 1000 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters. Location information thus obtained may be used in determining nearby peers for data distribution and retrieval.

In some embodiments, two or more users may establish a connection between their computing devices using any of the networking protocols listed previously, and any peer-to-peer protocols including BitTorrent, or that provided by the THETA network. In some embodiments, the user computing devices may use a network interface such as 1022 to communicate with various other computing entities, to exchange data content, information, and/or similar terms used herein interchangeably that can be transmitted, received, operated on, processed, displayed, stored, and/or the like.

In some embodiments, data (e.g., audio, video, etc.) may be downloaded by one or more user computing devices to a server such as shown in FIG. 11 when the device accesses a network connection, such as a wireless access point or hotspot. The data transfer may be performed using protocols like file transfer protocol (FTP), MQ telemetry transport (MQTT), advanced message queuing protocol (AMQP), hypertext transfer protocol (HTTP), and HTTP secure (HTTPS). These protocols may be made secure over transport layer security (TLS) and/or secure sockets layer (SSL).

Exemplary Management Computing Entity

FIG. 11 is an exemplary schematic diagram of a management computing entity or server node 1100, such as a task initiator/server, a tracker server, or a blockchain node, for implementing the THETA decentralized computing network, according to exemplary embodiments of the present invention. The terms computing entity, computer, entity, device, system, and/or similar words used herein interchangeably are explained in detail with reference to user computing entity 1000.

As indicated, in one embodiment, management computing entity 1100 may include one or more network or communications interface 1120 for communicating with various computing entities, such as by communicating data, content, information, and/or similar terms used herein interchangeably that can be transmitted, received, operated on, processed, displayed, stored, and/or the like. For instance, management computing entity 1100 may communicate with user computing device 1000 and/or a variety of other computing entities. Network or communications interface 1120 may utilize a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, management computing entity 1100 may be configured to communicate via wireless external communication networks using any of a variety of standards and protocols as discussed with reference to user computing device 1000.

As shown in FIG. 11, in one embodiment, management computing entity 1100 may include or be in communication with one or more processing unit 1110 (also referred to as processors, processing circuitry, processing element, and/or similar terms used herein interchangeably) that communicate with other elements within the management computing entity 1100. As will be understood, processing unit 1110 may be embodied in a number of different ways. For example, as one or more CPLDs, microprocessors, multi-core processors, coprocessing entities, ASIPs, microcontrollers, and/or controllers, in the form of integrated circuits, application specific integrated circuits (ASICs), field programmable gate arrays (FPGAs), programmable logic arrays (PLAs), hardware accelerators, other circuitry, and/or the like. As will therefore be understood, processing unit 1110 may be configured for a particular use or configured to execute instructions stored in volatile or non-volatile media 1130 and 1140. As such, whether configured by hardware or computer program products, or by a combination thereof, processing unit 1110 may be capable of performing steps or operations according to embodiments of the present disclosure when configured accordingly.

Although not shown explicitly, management computing entity 1100 may include or be in communication with one or more input elements, such as a keyboard, a mouse, a touch screen/display, a camera for motion and movement input, a mic for audio input, a joystick, and/or the like. Management computing entity 1100 may also include or be in communication with one or more output elements such as speaker, screen/display, and/or the like.

In various embodiments, one or more of the components of management computing entity 1100 may be located remotely from other management computing entity components, such as in a distributed system or in the cloud. Furthermore, one or more of the components may be combined and additional components performing functions described herein may be included in the management computing entity 1100. Thus, the management computing entity 1100 can be adapted to accommodate a variety of needs and circumstances. As will be recognized, these architectures and descriptions are provided for exemplary purposes only and are not limiting to the various embodiments.

Additional Implementation Details

One of ordinary skill in the art knows that the use cases, structures, schematics, and flow diagrams may be performed in other orders or combinations, but the inventive concept of the present invention remains without departing from the broader scope of the invention. Every embodiment may be unique, and methods/steps may be either shortened or lengthened, overlapped with the other activities, postponed, delayed, and continued after a time gap, such that every end-user device is accommodated by the server to practice the methods of the present invention.

The present invention may be implemented in hardware and/or in software. Many components of the system, for example, signal processing modules or network interfaces etc., have not been shown, so as not to obscure the present invention. However, one of ordinary skills in the art would appreciate that the system necessarily includes these components. A computing device is a hardware that includes at least one processor coupled to a memory. The processor may represent one or more processors (e.g., microprocessors), and the memory may represent random access memory (RAM) devices comprising a main storage of the hardware, as well as any supplemental levels of memory, e.g., cache memories, non-volatile or back-up memories (e.g., programmable or flash memories), read-only memories, etc. In addition, the memory may be considered to include memory storage physically located elsewhere in the hardware, e.g. any cache memory in the processor, as well as any storage capacity used as a virtual memory, e.g., as stored on a mass storage device.

The hardware of a computing device also typically receives a number of inputs and outputs for communicating information externally. For interface with a user, the hardware may include one or more user input devices (e.g., a keyboard, a mouse, a scanner, a microphone, a camera, etc.) and a display (e.g., a Liquid Crystal Display (LCD) panel). For additional storage, the hardware may also include one or more mass storage devices, e.g., a floppy or other removable disk drive, a hard disk drive, a Direct Access Storage Device (DASD), an optical drive (e.g., a Compact Disk (CD) drive, a Digital Versatile Disk (DVD) drive, etc.) and/or a tape drive, among others. Furthermore, the hardware may include an interface to one or more networks (e.g., a local area network (LAN), a wide area network (WAN), a wireless network, and/or the Internet among others) to permit the communication of streaming content and information with other computers coupled to the networks. It should be appreciated that the hardware typically includes suitable analog and/or digital interfaces to communicate with each other.

In some embodiments of the present invention, the entire system can be implemented and offered to the end-users and operators over the Internet, in a so-called cloud implementation. No local installation of software or hardware would be needed, and the end-users and operators would be allowed access to the systems of the present invention directly over the Internet, using either a web browser or similar software on a client, which client could be a desktop, laptop, mobile device, and so on. This eliminates any need for custom software installation on the client side and increases the flexibility of delivery of the service (software-as-a-service), and increases user satisfaction and ease of use. Various business models, revenue models, and delivery mechanisms for the present invention are envisioned, and are all to be considered within the scope of the present invention.

The hardware operates under the control of an operating system, and executes various computer software applications, components, program code, libraries, objects, modules, etc. to perform the methods, processes, and techniques described above.

In general, the method executed to implement the embodiments of the invention may be implemented as part of an operating system or a specific application, component, program, object, module or sequence of instructions referred to as "computer program(s)" or "program code(s)." The computer programs typically comprise one or more instructions set at various times in various memory and storage devices in a computing device or computer, and that, when read and executed by one or more processors in the computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of machine or computer-readable media used to actually effect the distribution. Examples of computer-readable media include but are not limited to recordable type media such as volatile and non-volatile memory devices, floppy and other removable disks, hard disk drives, optical disks (e.g., Compact Disk Read-Only Memory (CD-ROMS), Digital Versatile Disks, (DVDs), etc.), and digital and analog communication media.

Although specific embodiments of the disclosure have been described, one of ordinary skills in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skills in the art will appreciate that numerous other modifications to the illustrative implementations and architectures described herein are also within the scope of this disclosure.

Blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

A software component may be stored as a file or other data storage construct. Software components of a similar type or functionally related may be stored together such as, for example, in a particular directory, folder, or library. Software components may be static (for example, pre-established or fixed) or dynamic (for example, created or modified at the time of execution).

Software components may invoke or be invoked by other software components through any of a wide variety of mechanisms. Invoked or invoking software components may comprise other custom-developed application software, operating system functionality (for example, device drivers, data storage (for example, file management) routines, other common routines and services, etc.), or third-party software components (for example, middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Although the present invention has been described with reference to specific exemplary embodiments, it will be evident that the various modification and changes can be made to these embodiments without departing from the broader scope of the invention. Accordingly, the specification and drawings are to be regarded in an illustrative sense rather than in a restrictive sense. It will also be apparent to the skilled artisan that the embodiments described above are specific examples of a single broader invention which may have greater scope than any of the singular descriptions taught. There may be many alterations made in the descriptions without departing from the scope of the present invention.

TABLE 1

Exemplary Solidity Smart Contract for On-Chain Solution Verification

```
pragma solidity ^0.7.1;
interface VerifierInterface {
   function verifySolution(bytes memory solution, bytes memory zkProof)
external pure returns (bool);
}
contract RewardPoolWithOnChainVerification {
   struct Task {
      bytes32 hash;
      unit  reward;
      address payable solver;
      // another smart contract which can verify the task solution on-chain
      address verifierContract;
   }
   event RegisterTask(bytes32 taskHash, uint rewardAmount);
   event VerifiedSolution(bytes32 taskHash, bytes zkProof, address solver);
   address public taskInitiator;
   mapping(bytes32 => Task) public taskMap;
   constructor( ) {
      taskInitiator = msg.sender;
   }
   function registerTask(bytes32 taskHash, address verifierContract) public
payable {
      require(msg.sender == taskInitiator, "only task initiator can submit
task hash");
      require(taskMap[taskHash].hash == bytes32(0x0), "the task is already
registered");
      // Record the task on the blockchain
      taskMap[taskHash] = Task({
         hash: taskHash,
         reward: msg.value, // msg.value: amount of TFuelWei will be
automatically transfer to the contract
         solver: address(0x0),
         verifierContract: verifierContract
      });
      emit RegisterTask(taskHash, msg.value);
   }
   function submitSolution(bytes32 taskHash, bytes memory solution, bytes
memory zkProof) public {
      require(taskMap[taskHash].solver == address(0x0), "the task has been
marked as solved");
      VerifierInterface verifier =
VerifierInterface(taskMap[taskHash].verifierContract);
      if (verifier.verifySolution(solution, zkProof)) {
         address payable solver = msg.sender;
         taskMap[taskHash].solver = solver;
         uint reward = taskMap[taskHash].reward;
         taskMap[taskHash].solver.transfer(reward); // transfer the TFUEL
reward to the solver
         emit VerifiedSolution(taskHash, zkProof, solver);
      }
   }
}
```

TABLE 2

Exemplary Solidity Smart Contract for Off-Chain Solution Verification

```
pragma solidity ^0.7.1;
pragma experimental ABIEncoderV2;
contract RewardPoolWithOffChainVerification {
   struct Task {
      bytes32 hash;
      uint  reward;
      address solver;
   }
```

TABLE 2-continued

Exemplary Solidity Smart Contract for Off-Chain Solution Verification

```
    struct Solution {
        bytes32 taskHash;
        bytes32 solutionHash;
        address payable solver;
    }
    event CommitTask(bytes32 taskHash, uint rewardAmount);
    event CommitSolution(bytes32 taskHash, bytes32 solutionHash, address solver);
    event MarkSolutionAsSolved(bytes32 taskHash, bytes32 validSolutionHash, address solver);
    uint constant MIN_COLLATERAL = 10000000;
    address public taskInitiator;
    mapping(bytes32 => Task) public taskMap;
    mapping(bytes32 => Solution[ ]) public solutionMap;
    constructor( ) payable {
        taskInitiator = msg.sender;
        require(msg.value >= MIN_COLLATERAL); // to disincentivize malicious Task Initiators
    }
    function commitTask(bytes32 taskHash) public payable {
        require(msg.sender == taskInitiator, "only task initiator can submit task hash");
        require(taskMap[taskHash].hash == bytes32(0x0), "the task is already registered");
        // Record the task on the blockchain
        taskMap[taskHash] = Task({
            hash: taskHash,
            reward: msg.value, // msg.value amount of TFuelWei will be automatically transfer to the contract
            solver: address(0x0)
        });
        emit CommitTask(taskHash, msg.value);
    }
    function commitSolution(bytes32 taskHash, bytes32 solutionHash) public {
        require(taskMap[taskHash].solver == address(0x0), "the task has been marked as solved");
        solutionMap[taskHash].push(Solution({
            taskHash: taskHash,
            solutionHash: solutionHash,
            solver: msg.sender
        }));
        emit CommitSolution(taskHash, solutionHash, msg.sender);
    }
    function markTaskSolved(bytes32 taskHash, bytes32 validSolutionHash) public returns (bool) {
        require(msg.sender == taskInitiator, "only the task initiator can mark the task as solved");
        require(taskMap[taskHash].hash == taskHash, "incorrect task");
        require(taskMap[taskHash].solver == address(0x0), "the task has been marked as solved");
        Solution[ ] memory solutions = solutionMap[taskHash];
        for (uint i = 0; i < solutions.length; i++) {
            Solution memory solution = solutions[i];
            if (solution.solutionHash == validSolutionHash) {
                // found the first solver that committed the valid solution
                address solver = solution.solver;
                taskMap[taskHash].solver = solver; // mark the task as solved
                uint reward = taskMap[taskHash].reward;
                solution.solver.transfer(reward); // transfer the TFUEL reward to the solver
                emit MarkSolutionAsSolved(taskHash, validSolutionHash, solver);
                return true;
            }
        }
        return false;
    }
}
```

What is claimed is:

1. A computer-implemented method utilized by a peer initiator node having a computation task to be computed by a peer-to-peer edge computing network, wherein a solution to the computation task is verified on-chain by a blockchain network, comprising:

deploying, by the peer initiator node, a reward smart contract to a blockchain maintained by the blockchain network, wherein the peer-to-peer edge computing network comprises a first plurality of peer nodes including the peer initiator node, wherein each of the first plurality of peer nodes is an peer edge computing node configured to perform edge computing functions, wherein the blockchain network comprises a second plurality of peer nodes distinct from the first plurality of peer nodes, wherein each of the second plurality of peer nodes is a guardian node -participating in consensus to finalize blocks in the blockchain and in executing smart contracts in finalized blocks of the blockchain, and wherein each of the first plurality of peer edge computing nodes is connected to at least one of the second plurality of peer guardian nodes;

registering, by the peer initiator node, the computation task on the blockchain by sending an identifier for the computation task and an address of a deployed verifier smart contract to at least one of the second plurality of peer guardian nodes, as input to the deployed reward smart contract on the blockchain, wherein the deployed reward smart contract is executed by each of the second plurality of peer guardian nodes;

receiving, by the peer initiator node from a peer edge computing node, a ping message requesting task information for the computation task, wherein the task information is needed to complete the computation task, wherein the peer edge computing node has selected the peer initiator node based on an availability of the computation task polled from the deployed reward smart contract, and a reputation score of the peer initiator node;

sending, by the peer initiator node, to the peer edge computing node, the task information needed for the computation task, through a peer-to-peer network connection between the peer initiator node and the peer edge computing node; and downloading, by the peer initiator node, the solution to the computation task from the blockchain network, wherein the solution is computed and submitted to the deployed reward smart contract by the peer edge computing node, wherein the deployed reward smart contract is executed by each of the second plurality of peer guardian nodes to invoke the deployed verifier smart contract with the solution, wherein the deployed verifier smart contract is executed by each of the second plurality of peer guardian nodes to verify the solution, and wherein a reward is transferred from a reward pool on the blockchain to the peer edge computing node for computing the solution.

2. The computer-implemented method of claim 1, wherein a size of the solution is smaller than a given threshold for on-chain solution verification.

3. The computer-implemented method of claim 1, wherein the solution is encrypted by the peer edge computing node, wherein a zero-knowledge proof of the solution is provided by the peer edge computing node, and wherein the encrypted solution and the zero-knowledge proof of the solution are submitted to the deployed reward smart contract.

4. The computer-implemented method of claim 3, wherein the zero-knowledge proof is non-interactive.

5. The computer-implemented method of claim 1, wherein the identifier for the computation task is generated through a task hash function.

6. The computer-implemented method of claim 1, wherein the computation task is a first computation task, the peer edge computing node is a first peer edge computing node, the task information is a first task information, the peer-to-peer network connection is a first peer-to-peer network connection, the deployed verifier smart contract is a first deployed verifier smart contract, the solution is a first solution, and the reward is a first reward, the method further comprising:

registering, by the peer initiator node, a second computation task on the blockchain by sending an identifier for the second computation task and an address of a second deployed verifier smart contract to at least one of the second plurality of peer guardian nodes, as input to the deployed reward smart contract on the blockchain, wherein the first computation task is of a first task type and wherein the second computation task is of a second task type, wherein the first task type is different from the second task type, wherein the first computation task and the second computation task are not subtasks of a main computation task, and wherein the first deployed verifier smart contract is different from the second deployed verifier smart contract;

sending, by the peer initiator node, to a second peer edge computing node in the peer-to-peer edge computing network, a second task information needed to complete the second computation task, through a second peer-to-peer network connection between the peer initiator node and the second peer edge computing node; and downloading, by the peer initiator node, a second solution to the second computation task from the blockchain network, wherein the second solution is computed and submitted to the deployed reward smart contract by the second peer edge computing node, wherein the deployed reward smart contract is executed by each of the second plurality of peer guardian nodes to invoke the second deployed verifier smart contract with the second solution, wherein the second deployed verifier smart contract is executed by each of the second plurality of peer guardian nodes to verify the second solution, and wherein a second reward is transferred from the reward pool on the blockchain to the second peer edge computing node for computing the second solution.

7. The computer-implemented method of claim 1, wherein the computation task is a first subtask of a larger computation task, the method further comprising:

dividing the larger computation task into two or more subtasks including the first subtask;

assigning, by the peer initiator node, the two or more subtasks to two or more peer edge computing nodes to compute two or more subtask solutions respectively; and assembling, by the peer initiator node, the two or more subtask solutions into the larger computation task's solution.

8. The computer-implemented method of claim 1, wherein the peer initiator node tracks an availability of an active peer edge computing node in the first plurality of peer nodes based on heartbeat signals, wherein the heartbeat signals are sent by the active peer edge computing node through a peer-to-peer network connection between the peer initiator node and the active peer edge computing node.

9. The computer-implemented method of claim 1, wherein the peer initiator node uses peer discovery methods in the peer-to-peer edge computing network to select a candidate peer edge computing node from the first plurality of peer nodes based on a reputation score,
    wherein the peer initiator node sends task information to the candidate peer edge computing node through a peer-to-peer network connection between the peer initiator node and the candidate peer edge computing node.

* * * * *